US007209800B2

(12) United States Patent
Monz et al.

(10) Patent No.: US 7,209,800 B2
(45) Date of Patent: Apr. 24, 2007

(54) PROCESS AND SYSTEM FOR GENERATING OR VISUALIZING SETS OF CONTROL DATA

(75) Inventors: Joachim Monz, Uhingen (DE); Armin Lachner, Deizisau (DE)

(73) Assignee: TRAUB Drehmaschinen GmbH, Reichenbach (DE)

( * ) Notice: Subject to any disclaimer, the term of this patent is extended or adjusted under 35 U.S.C. 154(b) by 578 days.

(21) Appl. No.: 10/023,389

(22) Filed: Dec. 14, 2001

(65) Prior Publication Data

US 2002/0049960 A1  Apr. 25, 2002

Related U.S. Application Data

(62) Division of application No. 09/149,571, filed on Sep. 8, 1998.

(30) Foreign Application Priority Data

Sep. 9, 1997 (DE) ................................ 197 39 559

(51) Int. Cl.
G06F 19/00 (2006.01)
G06F 9/44 (2006.01)
G05B 11/01 (2006.01)
G05B 15/00 (2006.01)

(52) U.S. Cl. ........................... 700/184; 700/17; 700/83; 717/105

(58) Field of Classification Search ................ 700/180, 700/260, 159, 181, 9, 187, 86; 707/102; 717/140, 106
See application file for complete search history.

(56) References Cited

U.S. PATENT DOCUMENTS 4,912,625 A  3/1990  Glatfelter
5,046,022 A  9/1991  Conway et al.

(Continued)

FOREIGN PATENT DOCUMENTS

EP  0 642 066  3/1995

(Continued)

OTHER PUBLICATIONS

Storr, A. et al., "Einsatz objektorientierter Strukturen zur Programmierung von NC-Mehrschlittendrehmaschinen," *wt-Produktion und Management*, 84 (1994), pp. 26-39.

(Continued)

*Primary Examiner*—Wei Zhen
*Assistant Examiner*—Chih-Ching Chow
(74) *Attorney, Agent, or Firm*—Lipsitz & McAllister, LLC

(57) ABSTRACT

Methods and apparatus are provided for visualizing a control program of a machine tool. The machine tool is provided with operating units. The operating units may comprise machining units, which are provided with tools, and at least one workpiece receiver in accordance with a machine tool configuration. The machine tool is also provided with a computerized control for controlling movement of the operating units in accordance with a control configuration. Sets of control data are read from the control program with a data processing unit. Virtual operating units corresponding to the operating units of the machine tool, linkings of the virtual operating units, and virtual actions of the virtual operating units are automatically determined taking into account the machine tool configuration and the control configuration. The virtual operating units and their virtual actions are then represented for a user in the form of a machine display.

71 Claims, 12 Drawing Sheets

U.S. PATENT DOCUMENTS

| | | |
|---|---|---|
| 5,051,912 A | 9/1991 | Johanson et al. |
| 5,272,642 A | 12/1993 | Suzuki |
| 5,315,523 A * | 5/1994 | Fujita et al. ............ 700/180 |
| 5,315,525 A | 5/1994 | Blüthgen et al. |
| 5,444,636 A | 8/1995 | Yoshida et al. |
| 5,586,224 A * | 12/1996 | Kunii et al. ............ 700/260 |
| 5,610,842 A | 3/1997 | Seki et al. |
| 5,691,909 A * | 11/1997 | Frey et al. ............ 700/159 |
| 5,940,301 A * | 8/1999 | Damman et al. ........ 700/159 |
| 6,047,225 A * | 4/2000 | Iriguchi et al. .......... 700/187 |
| 6,356,800 B1 * | 3/2002 | Monz et al. ............ 700/184 |
| 6,553,268 B1 * | 4/2003 | Schwenke et al. ........ 700/18 |

FOREIGN PATENT DOCUMENTS

| | | |
|---|---|---|
| EP | 0 642 067 | 3/1995 |
| GB | 2 117 929 | 10/1983 |

OTHER PUBLICATIONS

"Einfach und werkstattnah programmieren," *TR Technische Rundschau*, Heft 37 1993, pp. 70-71.

Monz et al., "Neue Systeme fur werkstattorientierte Programmierverfahren," *wt Werkstattstechnik*, 77 (1987), pp. 575-581.

* cited by examiner

| FIG.4A |
| FIG.4B |

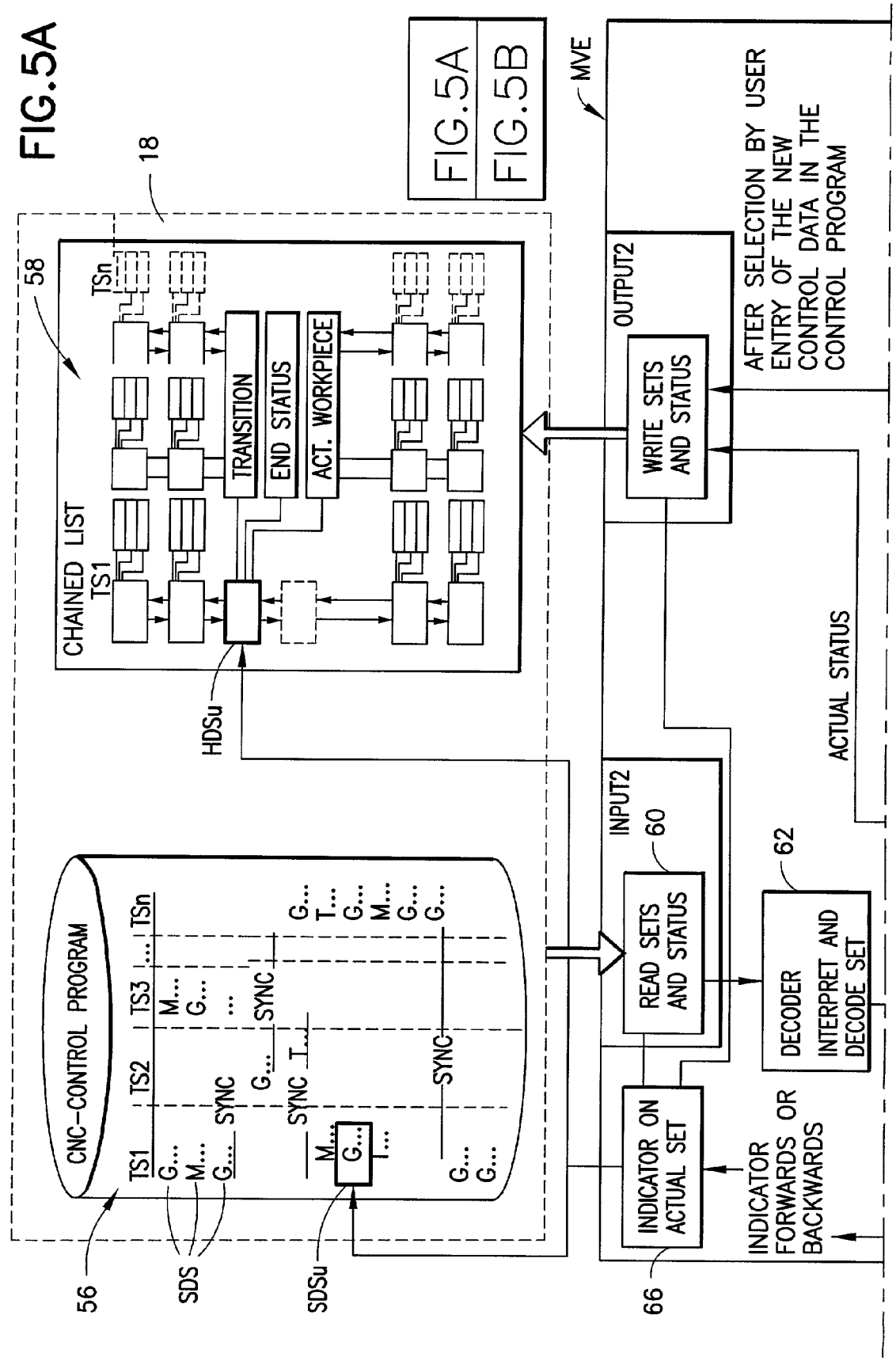

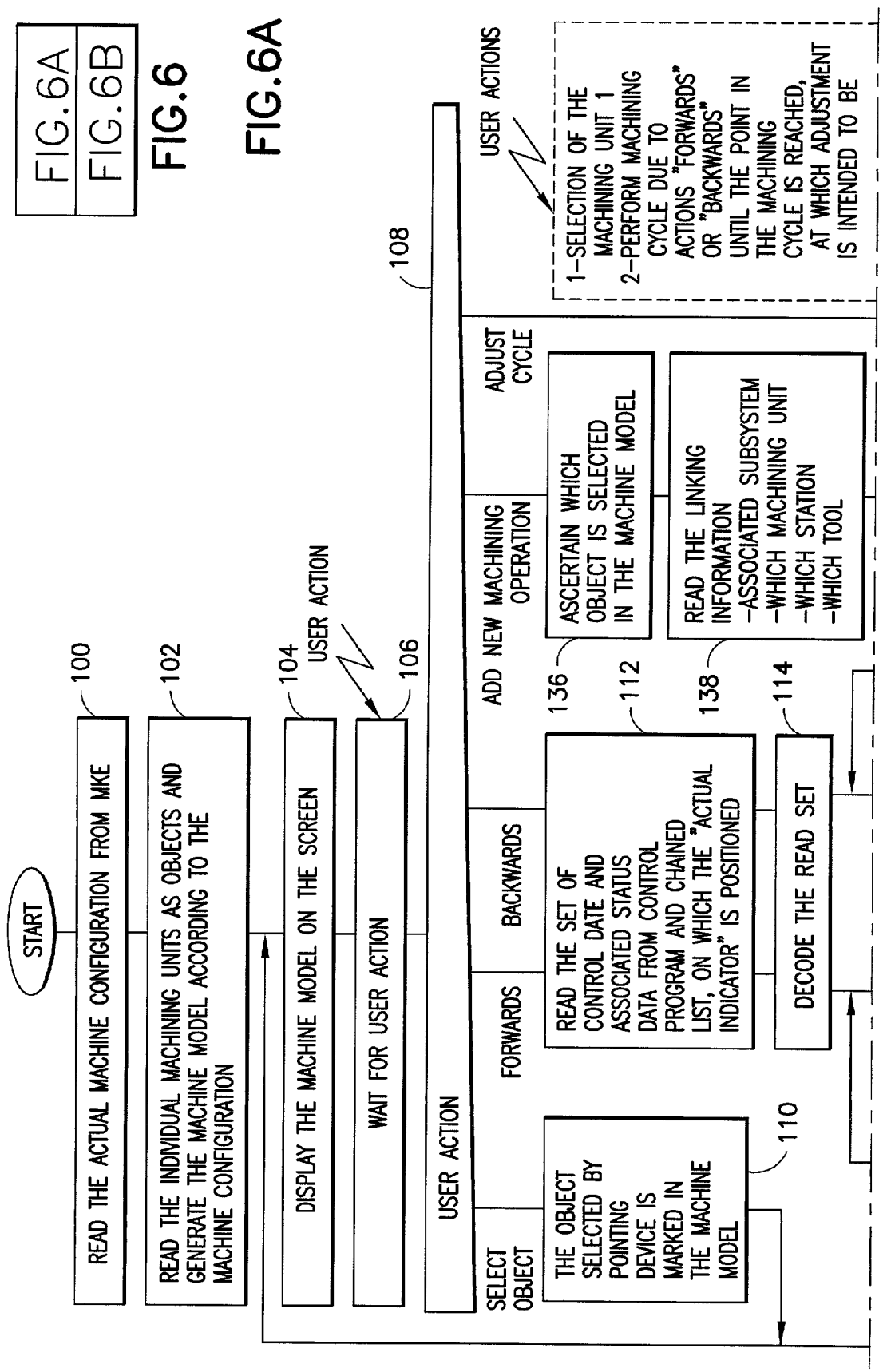

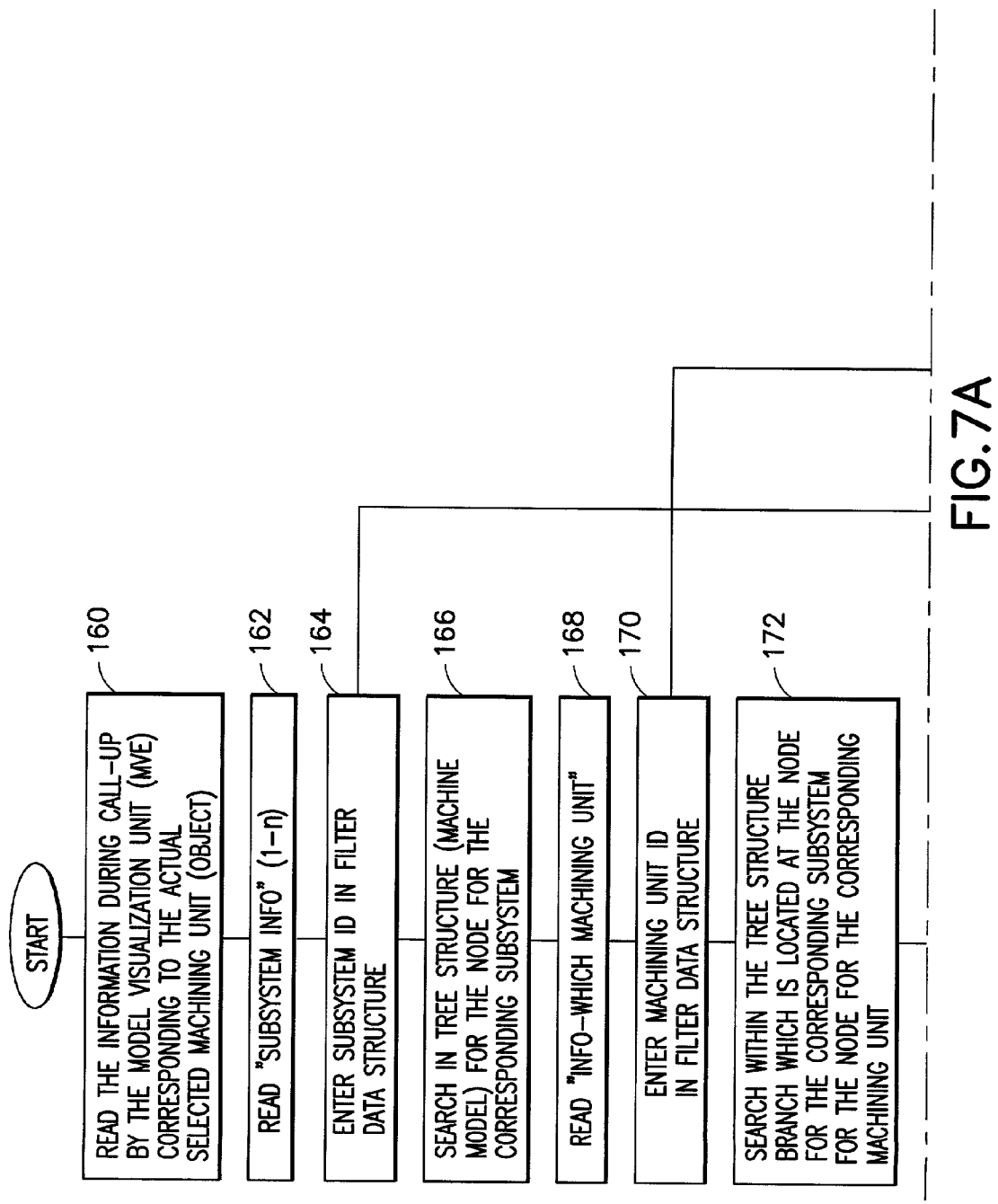

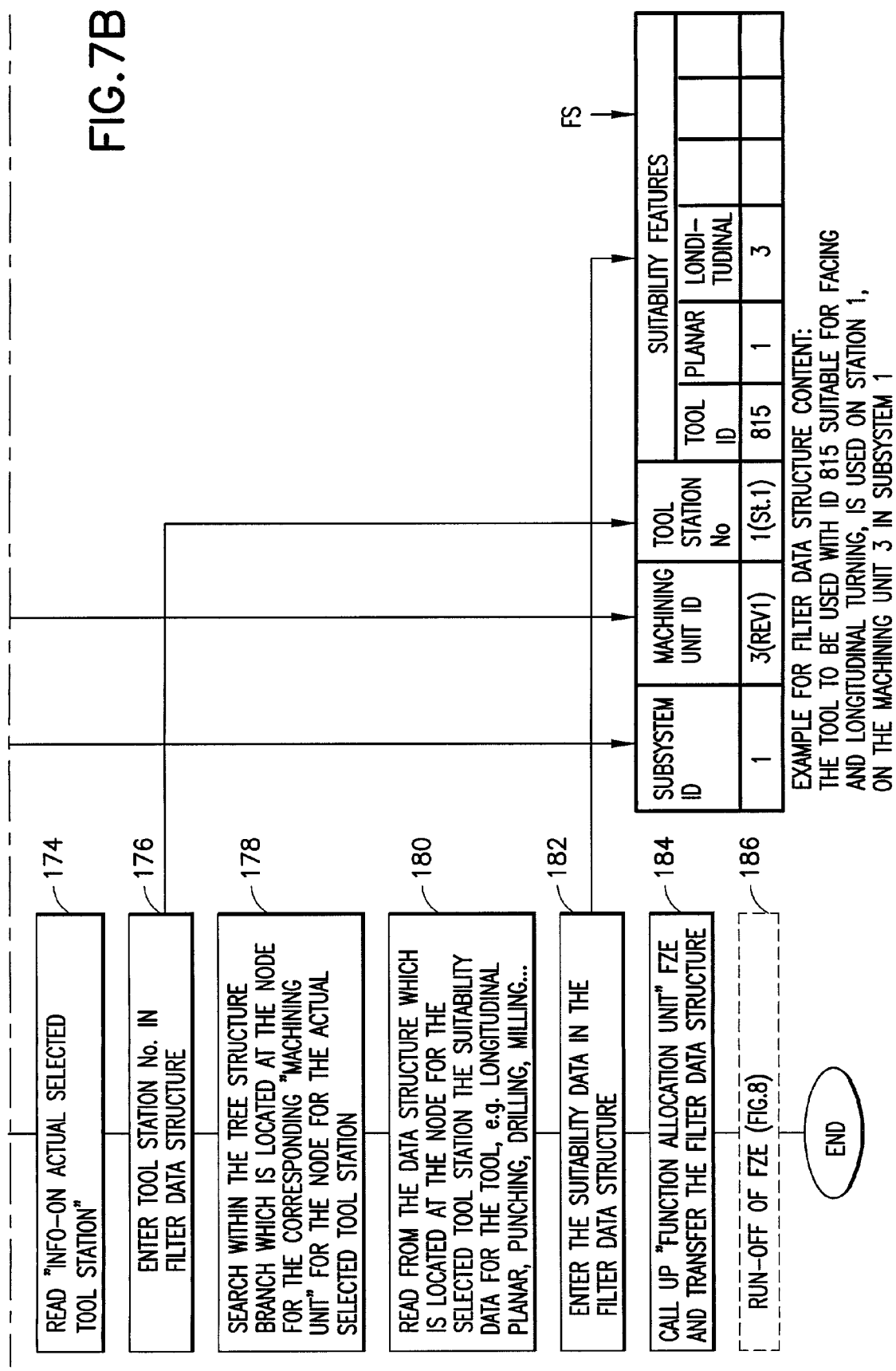

PROCESS AND SYSTEM FOR GENERATING OR VISUALIZING SETS OF CONTROL DATA

This application is a divisional of co-pending U.S. application Ser. No. 09/149,571 filed Sep. 8, 1998.

The invention relates first of all to a process and a system for generating or visualizing a control program for a machine tool having at least one sequence of sets of control data for the machining of a workpiece on this machine tool by means of operating units thereof controlled by this control program.

The inventive process serves, in particular, for generating sets of control data of machine tools comprising as operating units several machining units, such as tool carriers, drilling devices, punching slides and workpiece receiving means, wherein the operating units are each equipped with at least one axis of movement and the axes of movement are partially in interpolation relation to one another and preferably controlled by a computerized numerical control which has one or more so-called subsystems or channels. In the case of such complex machine tools it is necessary to divide the machining cycle, in particular, for a complete finishing of a workpiece into individual machining processes running at the same time or some at the same time or also one after the other by way of a reasonable, functional allocation of the various operating units to the individual subsystems or channels of the computerized numerical control in order to keep the production times for the machining of a workpiece as small as possible.

In this respect, it is necessary, in particular, to optimize the control of the operating units by the respective subsystem, on the one hand, and, on the other hand, to also coordinate with one another the work of the subsystems operating in parallel.

For this reason, it is necessary, in order to utilize the capacity, in particular, of such complex machines in an optimum manner, to assist a user as well as possible by way of an efficient process and an efficient programming system.

Programming systems are known from the state of the art which are designated as "graphically interactive programming systems", "autoprogramming systems" or as so-called "WOP systems" and known, for example, from EP-0 642 066 or 0 642 067.

All these processes and systems function, in principle, such that data inputs are required from the user during dialog with the data processing unit in order to generate a control program for the production of a workpiece on a numerically controlled machine tool, wherein the results of the data inputs are graphically shown on a screen for the purpose of control.

The basic concept of these known processes and systems is, however, to be seen in the fact that the control program is always generated by way of selective inputs of data relating to the control program in order to control the operating units via the machine control processing these data in the subsystem respectively allocated thereto, wherein the actions of the operating unit then result in accordance with the individual control data.

On account of the "graphically interactive programming systems" it is no longer necessary to enter sets of control data or sets of numerically controlled data of the control program directly since the "graphically interactive programming systems" make operating dialogs possible which are easily understood but the input data are still related to a control program.

The object underlying the invention is therefore to assist the user as comprehensively as possible during generation of the control program of a machine tool.

This object is accomplished in accordance with the invention, in a process for generating a control program for a machine tool having at least one sequence of sets of control data for the machining of a workpiece on this machine tool by means of operating units thereof controlled by this control program, in that for generating the control program a virtual workpiece and virtual operating units are represented by a data processing unit, that the individual, virtual operating units are addressed by the user and virtual actions specified to them by means of a data input unit and that the actions specified to the individual, virtual operating units are recorded by the data processing unit and the virtual actions specified to the individual, virtual operating units are automatically converted into sets of control data taking into account a predetermined machine and control configuration.

The advantage of the inventive solution is thus to be seen in the fact that in this case the user can generate a control program by merely specifying the actions to be performed by the operating units, i.e. information relating to the workpiece, i.e. the immediate machining cycle, and can thus specify the immediate effect on the workpiece without knowing or needing to keep in mind the machine and control configuration since, with the inventive process, the data processing unit automatically takes the machine and control configuration into account during generation of the sets of control data for the control program, proceeding from the required, virtual actions of the virtual operating units.

This means nothing more than that it is no longer necessary for the user to perform the default options for generation of the control program taking into account the special machine and control configuration, which presupposes that the user knows exactly at any point of time the kinematical conditions of the machine as well as the internal control allocation of operating units and their axes to the corresponding subsystem of the machine control and their dependency. It is, therefore, no longer necessary during generation, for example, of a program part for the control of an operating unit "drilling device" to allocate the information to the correct subsystem of the machine control and, in addition, to take into account the fact that the actions of this operating unit must be adjusted to the actions of other operating units which are allocated to other subsystems in order to avoid collisions between tools and operating units or tools with one another when carrying out machining.

Consequently, the entire complexity inherent in the machine and control configuration is shifted by the inventive solution from the user to the data processing unit and so the user has the possibility of concentrating exclusively on the virtual actions and virtual operating units to be specified.

Particular advantages occur when a user has to work with machines of different configurations since, in this case, he is released from the particular problems of always keeping in mind different machine and control configurations during generation of the respective control program of different machines and of not mixing up these different machine and control configurations.

In principle, it is sufficient in order to realize the inventive process to represent one virtual operating unit and its actions and then allocate the desired actions each time to this one virtual operating unit.

For reasons of the clarity and completeness of the information for the user it is, however, particularly advantageous when all the virtual operating units of the machine tool are represented for the user in accordance with the actual machine configuration in the form of a machine display so that the user can always assess the entire machine tool with the operating units available and, where applicable, being put to use.

In principle, it would be sufficient for the inventive process to represent the operating units and specify the actions thereof, for example, by way of parameter data. It is, however, particularly advantageous when all the virtual operating units and their virtual actions are represented for the user taking into account the machine and control configuration of the machine tool so that the user has, in particular, the possibility of assessing the actions of the operating units and, for example, of thus assessing whether operating units will collide during the specified actions with other operating units or with the workpiece or with other parts of the machine tool.

In principle, it would be possible to provide the representation of the virtual operating units and their virtual actions in a separate procedure. It is, however, particularly advantageous for a user when the virtual operating units and their virtual actions are represented after they have been addressed and specified, i.e. that the user addresses the respective operating unit, specifies the respective virtual action to it and then both the virtual operating unit and the virtual action are represented for the user after termination of the specification of the virtual action so that the user is in a position immediately after each specification of a virtual action for an addressed operating unit to check what effect this specified virtual action actually has. Thus, error inputs and erroneously specified actions can, in particular, be avoided in a simple manner.

With respect to the way, in which the machine and control configuration is taken into account within the scope of the inventive solution, no further details have so far been given. There are, in this respect, different ways of taking the machine and control configuration into account. For example, it would be conceivable to specify the machine and control configuration in the form of an interrelationship which is already determined. A particularly advantageous solution provides for a linking of virtual operating units specified in a defined manner to be carried out automatically by the data processing device in order to take into account the machine and control configuration.

This means that a defined specification of the machine and control configuration does not take place but that in accordance with the inventive solution only virtual operating units specified in a defined manner exist which are present first of all without any linking and that a linking of the virtual operating units specified in a defined manner is then carried out automatically by the data processing device in accordance with the machine and control configuration.

This solution increases the flexibility of the inventive process since, generally, a given number of virtual operating units can be specified in a defined manner and thus during adaptation of the respective process to a different machine and control configuration only information regarding the linkings need be altered and the data processing device is thus in a position on the basis of the altered information regarding the linkings to link the virtual operating units, which are always specified in a defined manner, in an altered manner in accordance with the altered machine and control configuration.

This means that the inventive process can be used in a large number of machine tools, wherein the only condition is that the virtual operating units specified in a defined manner must be of such a number that all the desired machine and control configurations can be realized by changing the linking between them.

A particularly expedient way of taking into account the machine and control configuration provides for the machine and control configuration to be taken into account with the aid of a machine model which comprises information concerning linkings of the virtual operating units representing the machine and control configuration.

Such a machine model represents a very simple data structure, with which the machine and control configuration can be taken into account.

In this respect, the machine model is preferably built up such that it comprises a basic configuration of the virtual operating units of the machine tool which can be extended by the user. For example, it is conceivable in this respect to configure the basic configuration such that only the linkings between the virtual operating units which are determined on the basis of the machine construction are the subject matter of the basic configuration, i.e., for example, turrets and their axis movements determined by slides, whereas the individual stations of the turret can still be freely configured and thus tools or other machining units, such as, for example, counterspindles etc., can then be allotted to these individual stations by the user. It is thus ensured, on the one hand, that the linkings defined by the basic construction of the machine tool need not be built up in a time-consuming manner by the user himself but are already present but, on the other hand, the user has every possibility of still configuring the machine present in its basic construction in detail in accordance with the respective use, for example, with respect to tools.

In this respect, it is particularly favorable when the machine model is generated by means of stored linking information so that, for example, different linking details are stored in a memory in accordance with different types of machine tools and can then be called up in accordance with the respective type of machine tool.

In this respect, it is preferably provided for the machine model, which links the individual, virtual operating units of the machine tool in accordance with the machine and control configuration, to be stored in the data processing unit so that this machine model is then present for the further operation of the inventive process in a complete state and need not always be built up anew.

One particularly favorable solution provides for the machine model to be used in the data processing unit in the form of a data tree structure since a data tree structure is particularly suitable for recording the interrelationships of a machine and control configuration.

In this respect, it is expediently provided for the data tree structure to have the form of a hierarchical data tree structure which can then be queried each time in accordance with the different hierarchy planes.

With respect to how the virtual actions are specified for the virtual operating units, no further details have been given in conjunction with the preceding comments on the individual, inventive solutions. It would, for example, be conceivable to give the user the possibility of specifying freely selectable machining operations for each addressed, virtual operating unit. There is, however, the risk that the user will select machining operations which cannot be realized with the specified virtual operating unit, i.e., for example, with a tool provided in one station of a turret, because they would, for example, lead to destruction of the tool or would cause an unreasonable wear and tear thereof.

For this reason, a particularly preferred solution of the inventive process provides for the machining operations realizable with each virtual operating unit to be ascertained automatically by the data processing unit for this operating unit. This precludes from the outset that machining operations will be specified by the user which are unsuitable for the respective virtual operating unit.

This ascertainment of the machining operations possible with the respective virtual operating unit, i.e., for example, the respective virtual tool, can be carried out in the most varied of ways. For example, the number of realizable machining operations can be recorded in a table for each virtual operating unit. This does, however, require a great deal of memory space. For this reason, it is preferably provided for a set of filter data to be generated for ascertaining the realizable machining operation, this set of filter data enabling the suitable machining operations to be filtered out of a plurality of such operations.

The set of filter data can also be specified by way of storing in a table. It is, however, even more advantageous when the set of filter data is generated on the basis of the machine and control configuration and thus represents the respective machine and control configuration definitely available.

In this respect, it would be conceivable to leave the user to generate the set of filter data. It is, however, even more advantageous when the set of filter data is ascertained automatically by the data processing unit in accordance with the machine and control configuration so that it is always ensured that the set of filter data is built up in accordance with the machine and control configuration.

In order to ascertain the machining operations which are now possible it is preferably provided for a list of machining operations performable with the respective virtual operating unit to be selected with the set of filter data from a list of all the possible machining operations.

In order to now give the user the possibility of selecting the desired machining operation from those performable with the respective virtual operating unit in a simple manner it is preferably provided for the list with the machining operations allocated to the respective virtual operating unit to be presented so as to be selectable for a user, i.e. for the list to be presented such that the user can directly select the respectively desired machining operation and the machining operation is already taken over due to the selection.

It is particularly convenient for the user when the sets of control data for the control program are ascertained automatically by the data processing unit on the basis of the addressed, virtual operating unit and the virtual machining operation correspondingly selected and thus the input data of the user are limited to, on the one hand, selecting the operating unit and then selecting the desired machining operation from the possibility of the virtual machining operations presented.

In conjunction with the solution described thus far, it has merely been assumed that the virtual operating units and their virtual actions are represented. In principle, this is sufficient to show the user whether the input data are reasonable and relevant for the respective case. It is, however, particularly favorable when the change in shape of a virtual workpiece due to machining thereof is represented by means of virtual actions of the virtual operating units. This additional representation of the shape of the tool makes it even clearer for the user whether the input data correspond to his ideas.

There are various possibilities for representing the changes in shape. It is particularly favorable when the change in shape of the virtual workpiece is ascertained by way of a cut calculation, i.e. it is calculated immediately what effects the respective virtual actions of the virtual operating units have, wherein a cut calculation is to be understood as the calculation of the effect of any type of material removal, a machining, grinding action or also, for example, material removal in another way, such as, for example, laser treatment or the like.

In order, in addition, to give the user the possibility of being able to check the generated control program again as a whole or also in parts, it is provided for the sets of control data of the control program to be decoded and interpolated by the data processing unit in the same way as in a decoder and interpolator of the machine control for the operating units of the machine tool. This opens up the possibility of checking the control program under the conditions, under which it will later run for the machining of the workpiece on the machine tool.

In this case, it is provided—in order to be able to visualize the effects of the individual sets of control data—for the virtual actions of the virtual operating units to be ascertained and represented during the interpolation using the machine and control configuration so that the possibility exists of representing the exact cycle—but generally with a time delay—as it then results in the machine tool.

In this respect, it is particularly favorable when the machine model is used during the interpolation for ascertaining the virtual actions, this machine model preferably simulating a "virtual machine tool" for an interpolator carrying out the interpolation.

In this respect, it is particularly favorable for checking the control program when the machining of the virtual workpiece is represented at any time on the virtual workpiece so that the user can check step by step what effect the specified virtual actions then have on the workpiece itself.

In conjunction with the description of the most varied of embodiments of the inventive solution no details have been given as to the manner, in which a representation of the virtual actions of the virtual operating units is intended to take place. The simplest possibility would be to visualize the virtual actions of the virtual operating units in a machining sequence provided for a machining of the virtual workpiece since this corresponds to the normal cycle of the control program and the normal processing of the sets of control data.

A particularly favorable solution does, however, provide for the virtual actions of the virtual operating units to be visualized in a machining sequence provided for a machining of the virtual workpiece or in a reverse machining sequence so that the user not only has the possibility of checking and following the entire control program in the machining sequence but also of checking the control program in a reverse machining sequence in order, in particular, to check critical program sections or movements of the operating units such that, for example, collisions can easily occur.

For this purpose, the most varied of possibilities are conceivable. It would be conceivable, for example, to generate during the interpolation for a visualization of the control program in machining sequence a set of data, which records point for point the movement, for example, of a tool, and then to store this entire set of data in order to have the possibility with it of also visualizing for the user the movement of the operating unit, i.e., for example, the tool, in a reverse machining sequence.

This solution does, however, require a considerable amount of computer time and a great deal of memory space. This solution requires considerable resources, in particular, when an entire control program is intended to be visualized in reverse machining sequence.

For this reason, a particularly favorable solution provides for auxiliary data to be generated for each set of control data, in addition to the sets of control data, taking into account the machine tool and control configuration, these auxiliary data permitting a visualization of the virtual actions in a reverse machining sequence. These auxiliary data are generated in such a manner that they merely supplement the set of control data to the extent that it is possible to run through the set of control data in a reverse machining sequence, i.e. that all those data are generated as auxiliary data which are not explicitly part of the set of control data and result automatically from the processing of successive sets of control data in machining sequence but make an inversion of the machining sequence impossible on account of the fact that they are missing.

These auxiliary data can be generated and stored in the most varied of ways. A particularly advantageous solution provides for the auxiliary data to be allocated to each set of control data in the form of a set of auxiliary data so that the allocated auxiliary data exist for each set of control data as a clearly delimited set of auxiliary data.

In order to have to provide these sets of auxiliary data with as little data as possible and, on the other hand, clearly configure their allocation to the respective sets of control data as well, it is preferably provided for the sets of auxiliary data to be stored in a chained list and for all the auxiliary data for running through the control program in a reverse machining sequence to then be taken from this chained list of sets of auxiliary data.

The most varied of data can be stored as a set of auxiliary data. A particularly favorable possibility provides for the set of auxiliary data to comprise a set of transition and/or status data. In accordance with the invention, only transition data or only status data are included in the set of auxiliary data when these are sufficient. Only if it is necessary to include both transition as well as status data in the set of auxiliary data will both types of data be included.

In order, at the same time, to also record the changes in shape of the workpiece in a simple manner and, in particular, to then realize a running through of the control program in a reverse machining sequence in as simple a manner as possible, it is preferably provided for shape data of the virtual workpiece to be ascertained for each set of control data and for these shape data to then likewise be stored in order, for example, to have the unmachined workpiece result optically from the machined workpiece during a processing of the control program in a reverse machining sequence.

These shape data of the workpiece are likewise to be stored. A particularly favorable possibility provides for the shape data to be stored in the set of auxiliary data so that the change in shape of the workpiece may also be ascertained at the same time from the set of auxiliary data.

A particularly favorable solution of the inventive process provides for not only the control program but also the chained list to be accessed and the corresponding set of auxiliary data to be read from the chained list for each set of control data so that during the processing of the control program not only the set of control data but also the set of auxiliary data are always present and can be used for visualizing the virtual action of the virtual operating units, in particular, in conjunction with the machining of the virtual workpiece.

In this respect, it is particularly favorable when the set of control data to be processed as well as the associated set of auxiliary data are recorded by the data processing unit at the same time so that both sets of data are available to the data processing unit.

It is particularly favorable for the simultaneous recording of the set of control data and the set of auxiliary data when the chained list is stored and a set of auxiliary data is clearly allocated to each set of control data.

A particularly preferred solution, with which the virtual actions of the virtual operating units can be represented, provides for sets of control data and auxiliary data to be recorded with the data processing unit in machining sequence or in reverse machining sequence and represented by the virtual operating units and virtual actions, i.e., it is possible with this solution to process the sets of control data in reverse machining sequence and, at the same time, record the corresponding sets of auxiliary data and thus represent all the virtual actions of the virtual operating units completely with the two together, even in reverse machining sequence.

The object specified at the outset is, however, also accomplished in accordance with the invention by a programming system for processing a control program for a machine tool which serves for the machining of a workpiece by means of operating units of the machine tool controlled by this control program, comprising a data input unit for entering and/or changing information which determines the control program of the machine tool, a visualization device for representing the information and a data processing unit which converts the information into sets of control data determining the control program and stores these in a program memory, in that the data processing unit comprises a model visualization unit which is designed such that with it at least one virtual operating unit of the machine tool and its virtual actions can be represented by means of the visualization device, that the model visualization unit interacts with the data input unit such that the virtual operating units can be addressed via the data input unit and virtual actions specified to these virtual operating units, and that with the model visualization unit the virtual actions specified to the individual, virtual operating units can be converted into the sets of control data of the control program taking into account the machine and control configuration.

The advantage of the inventive programming system is shown in the same way as with the inventive process and so reference can made in full thereto.

In addition, the same advantageous embodiments result for the inventive programming system as those already described in detail in the above in conjunction with the inventive process together with the respective advantages and so reference can be made in full hereto.

In addition, the inventive object is accomplished in accordance with the invention in a process for the visualization of a control program of a machine tool in that sets of control data are read from the control program with a data processing unit, virtual operating units, their linkings and their virtual actions are automatically ascertained taking into account the machine and control configuration and the virtual operating units and their virtual actions are then represented for a user in the form of a machine display.

The inventive solution has the great advantage that it makes available a simple solution, with which a control program can be checked, wherein this solution is not limited to a single machine tool but, in view of the fact that the machine and control configuration is taken into account, the checking can be carried out for machine tools of different configurations and so the inventive process may be used in a plurality of machine tools and a plurality of control programs for a plurality of machine tools may be checked, for example, with one workstation.

In addition, the inventive solution also has the great advantage that knowledge of the specific machine and control configuration is not even necessary for the checking of the control program by the user since this is automatically taken into account during the ascertainment of the virtual action of the virtual operating units and thus only the virtual actions of the virtual operating units are represented and checked by the user and so the user can concentrate on the actual procedures relating to the workpiece which are initiated by the control program in conjunction with a machine tool.

In this respect, it is particularly favorable when a linking of the virtual operating units is automatically carried out by the data processing unit on the basis of a predetermined model configuration in order to take into account the machine and control configuration; this means that virtual operating units are preferably specified in a defined manner to the data processing unit and a different linking of the virtual operating units is carried out in accordance with the model configuration depending on the different machine and control configuration without the user needing to have any influence on this.

In this respect, it is particularly expedient when the machine and control configuration is taken into account with the aid of a machine model which comprises information concerning linkings of the virtual operating units representing the machine and control configuration. This machine model represents as simple and expedient a data configuration as possible.

In this respect, it is advantageous when the machine model is generated by means of stored linking information.

It is particularly expedient when the machine model is stored in the data processing unit and this links the individual, virtual operating units of the machine tool in accordance with the machine and control configuration so that all the linkings are always available for interrogation by means of this machine model.

It is favorable when the machine model is used in the data processing unit in the form of a data tree structure, wherein this data tree structure advantageously has the form of a hierarchical data tree structure. The storage of the machine model in the form of such a structure has the advantage that with it the machine and control configuration may be represented in a simple manner and also used favorably for the visualization.

In conjunction with the preceding description of the inventive solution, it has merely been assumed that the virtual operating units and their virtual actions are represented. It is particularly favorable within the scope of the inventive solution when, in addition, the change in shape of a virtual workpiece due to machining thereof is represented by means of the virtual actions of the virtual operating units so that all the information is visualized for the user which the user requires in order to assess the control program.

The change in shape of the virtual workpiece can be recorded in the most varied of ways. It would be conceivable, for example, to include and store the change in the shape of the workpiece point for point from the beginning of the control program. It is, however, particularly favorable when the change in shape of the virtual workpiece is ascertained by way of a cut calculation.

In order, in particular, within the scope of the inventive process to have the same conditions present as those present later during the running of the control program in a machine tool, it is preferably provided for the sets of control data of the control program to be decoded and interpolated in the data processing unit in the same way as in a decoder and an interpolator of the machine control for the operating units of the machine tool.

In this case, it is expedient for generating the machine display when the virtual actions of the virtual operating units are ascertained and represented during the interpolation using the machine and control configuration so that a so-called virtual machine tool is available for the interpolation, on the basis of which the virtual actions of the virtual operating units then result.

A particularly favorable procedure provides for the machine model to be used during the interpolation for ascertaining the virtual action since this represents the machine and control configuration in a particularly simple manner.

In order to convey to the user at any time information concerning the appearance of the workpiece, it is preferably provided for the machining of the virtual workpiece to be represented at any time on this virtual workpiece.

In order for the checking of the control program to be particularly convenient for the user, in particular, in order to give him the possibility of checking difficult sections of the control program exactly, for example, of checking whether collisions of the operating units occur or collisions of the operating units with other parts of the machine tool, it is preferably provided in the inventive process for the virtual actions of the virtual operating units to be visualized in a machining sequence provided for machining of the virtual workpiece or in a reverse machining sequence; this means that the user has not only the possibility of checking the control program in the machining sequence but also at the passages of interest to him or of generally having the entire control program run in a reverse machining sequence in order to recognize all the problems thereof possibly arising.

In order to represent the virtual action in a reverse machining sequence it would be possible, for example, during running of the control program in machining sequence to record all the movements of the operating units point for point, store them and then represent them again in a reverse machining sequence. This is, however, time-consuming, requires a considerable computer capacity and a high storage capacity. For this reason, it is preferably provided for auxiliary data to be generated for each set of control data, in addition to the sets of control data, taking into account the machine tool and control configuration, these auxiliary data permitting a visualization of the virtual action in a reverse machining sequence. These auxiliary data are thereby limited to those data which are required in addition to the sets of control data in order to visualize the sets of control data in a reverse machining sequence.

The auxiliary data can thereby be generated in any optional manner and stored. It is, however, particularly favorable when auxiliary data are allocated to each set of control data in the form of a set of auxiliary data so that each set of control data is supplemented by the set of auxiliary data.

The amount of auxiliary data may be reduced, in particular, when the sets of auxiliary data are stored in a chained list so that each set of auxiliary data can be interpreted in conjunction with the preceding and following set of auxiliary data.

With respect to the type of auxiliary data used, it is particularly favorable when the set of auxiliary data comprises a set of transition and/or status data since, with these sets of data, the minimum amount of auxiliary data need be stored.

When the representation of the virtual workpiece is intended to be added to the representation of the virtual operating units and the virtual actions and, in particular, when the representation of the changes in shape of the virtual tool is intended to be realizable in a reverse machining sequence, as well, it is necessary to record the data with respect to the change in shape of the workpiece. For example, it would be conceivable to record the data of the change in shape of the workpiece point for point, which does, however, require a considerable computer capacity and a high memory capacity. For this reason, it is favorable when shape data of the virtual workpiece are ascertained for each set of control data. This means that in this case the shape data of the virtual workpiece are allocated to the respective set of control data.

In order to store these shape data it has proven to be particularly advantageous when the shape data are stored in the set of auxiliary data so that the set of auxiliary data also comprises the shape data of the workpiece and thus the set of auxiliary data supplies the complete information which is required in addition to the set of control data in order to be able to represent the virtual operating units, their virtual actions and the changes in shape of the virtual workpiece in a reverse machining sequence.

In order to find the data during representation of a control program in a reverse machining sequence, it has proven to be particularly expedient when not only the control program but also the chained list are accessed and the corresponding set of auxiliary data is read from the chained list for each set of control data so that the information required for the representation of the control program in a reverse machining sequence can be recorded in conjunction with the set of control data. A particularly favorable solution provides for both the set of control data to be processed and the associated set of auxiliary data to be determined by the data processing unit at the same time and thus for both data to be available at the same time.

The use of sets of control data and corresponding auxiliary data makes it possible for sets of control data and auxiliary data to be recorded with the data processing unit in machining sequence or in reverse machining sequence and to be represented by the virtual operating units and virtual actions.

In addition, the object specified at the outset is also accomplished in accordance with the invention by a system for the visualization of a control program of a machine tool comprising a data processing unit and a visualization device in that the data processing unit comprises a model visualization unit, with which sets of control data can be read from the control program, virtual operating units, their linking and their virtual actions can be ascertained independently taking into account the machine and control configuration and the virtual operating units and their virtual actions can then be represented for a user in the form of a machine display.

The advantages of this system are the same as those described in conjunction with the process specified above.

Furthermore, with respect to advantageous developments of this system reference is also made in full to the comments on the advantageous developments of the process specified above as well as the comments on the individual embodiments of the process and the programming system for generating a control program described at the outset.

Additional features and advantages of the invention are the subject matter of the following description as well as the drawings illustrating one embodiment.

In the drawings:

FIG. 7 shows a functional diagram for generation of a set of filter data in a model configuration unit illustrated in FIG. 4

Figure 1:
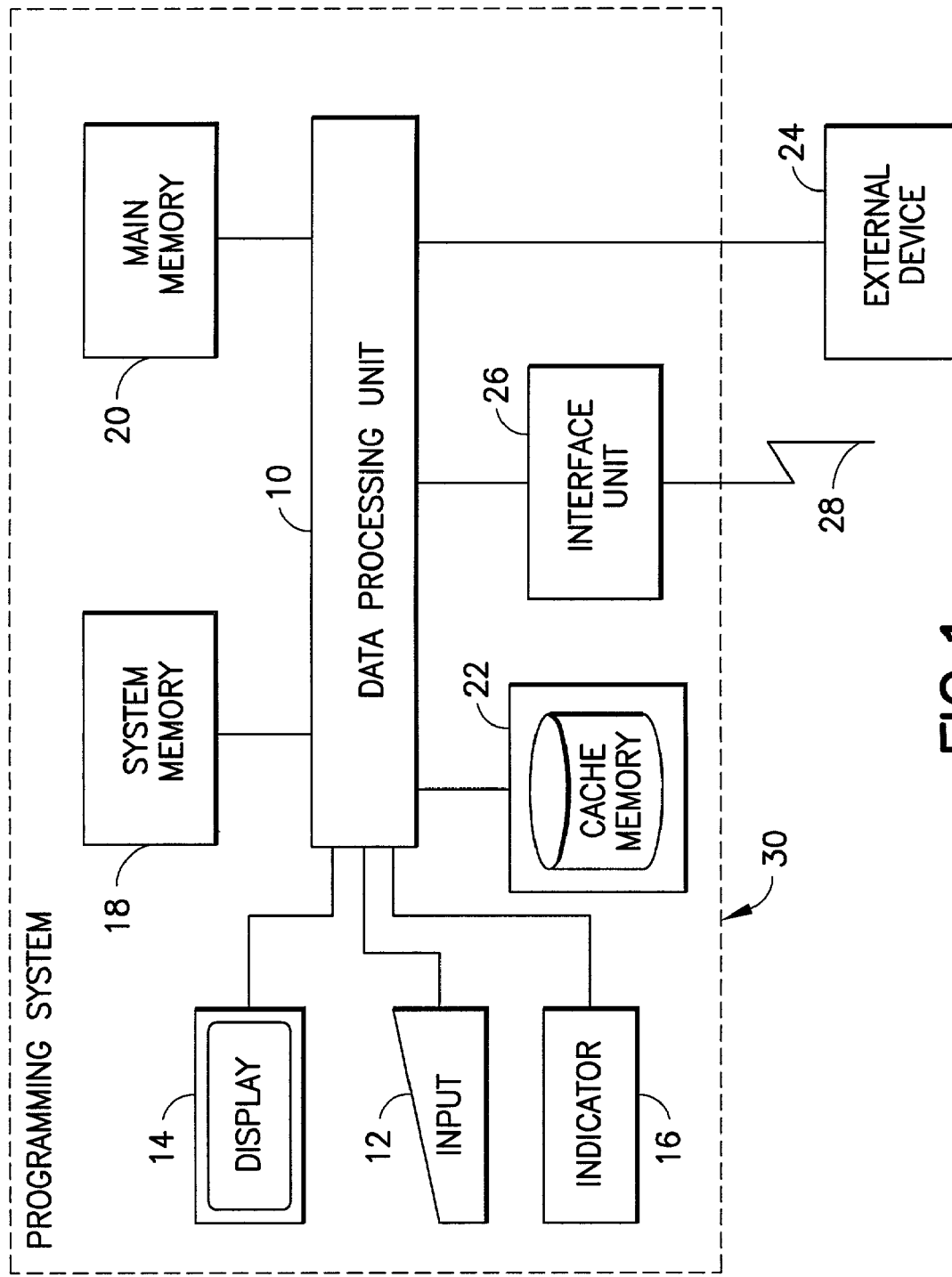
FIG. 1 shows a schematic illustration of an inventive system with the required units.

One embodiment of an inventive programming system, illustrated in FIG. 1, comprises a data processing unit which is designated as a whole as 10 and with which a data input unit 12 is connected which is designed, for example, as a keyboard.

Furthermore, a visualization device 14, for example, a screen is connected to the data processing unit 10 and this is in a position to show not only graphic but also numerical information.

In addition, an indicator unit 16, which serves, for example, to address individual elements on the screen 14, is connected to the data processing unit 10.

The inventive data processing unit operates with a system memory unit 18, as well as a main memory unit 20 and a cache memory unit 22 which will be explained in detail in the following.

The data processing unit 10 is in a position to communicate with external devices, for example, the device 24 or exchange data with other apparatus via an interface unit 26 as well as a data line 28.

Figure 2:
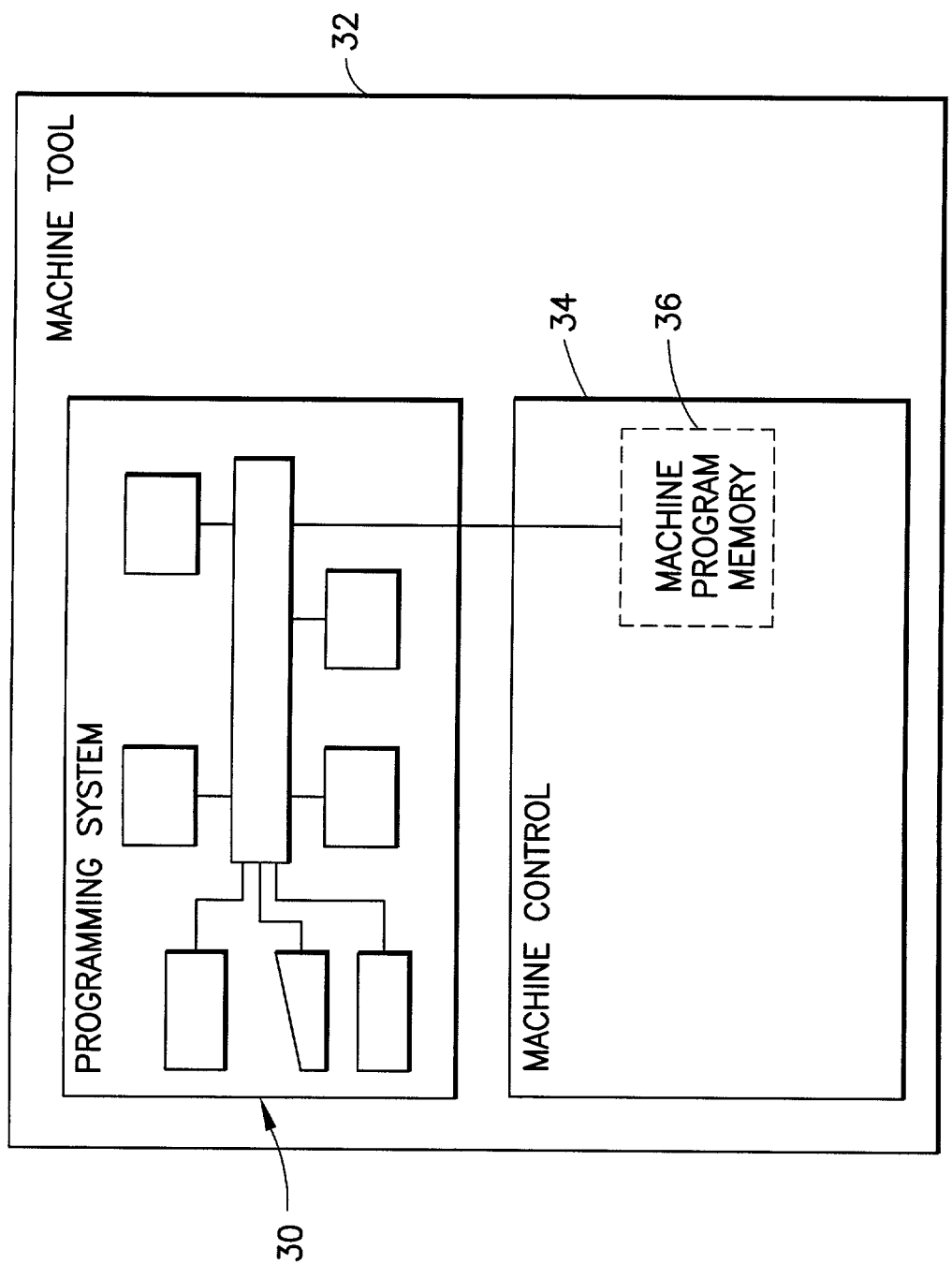
FIG. 2 shows a first possible use of the inventive system.

One example of use of an inventive programming system is illustrated in FIG. 2. In this case, the programming system designated in FIG. 1 as a whole as 30 is integrated into a machine tool 32 and cooperates directly with the machine control 34 provided for the machine tool, wherein it is possible, in particular, for the programming apparatus 30 to have direct access to a machine program memory 36 of the machine control 34 designed, for example, as a computerized numerical control.

Figure 3:
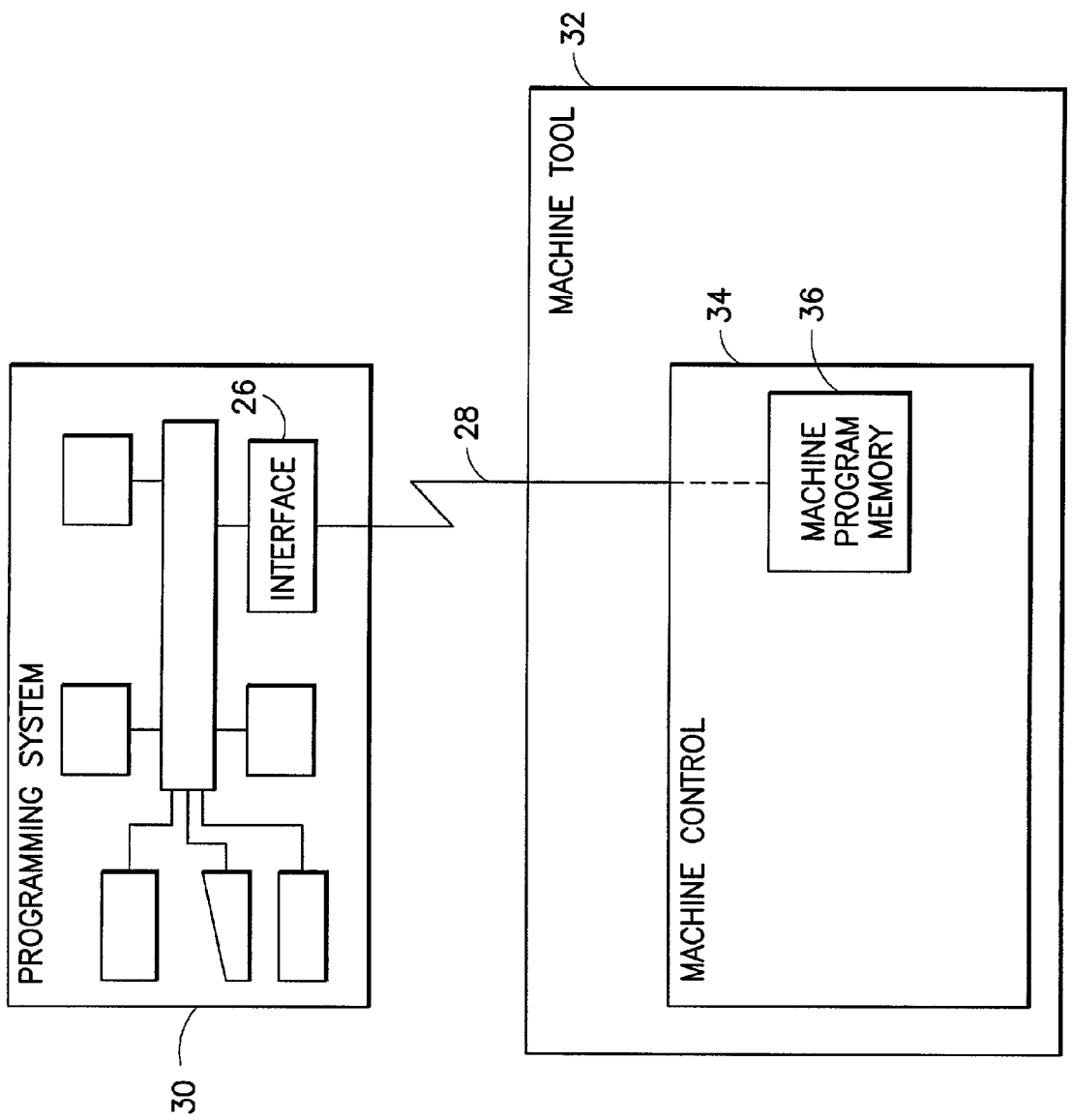
FIG. 3 shows a second possible use of the inventive system.

Alternatively thereto, it is possible, as illustrated in FIG. 3, to use the inventive programming apparatus 30 in such a manner that this communicates via the interface unit 26 and the data line 28 with the machine control 34, in particular the machine program memory 36 thereof, wherein, in this case, the programming apparatus 30 is realized, for example, in the form of an external workstation communicating with the machine control 34.

Figure 4A:
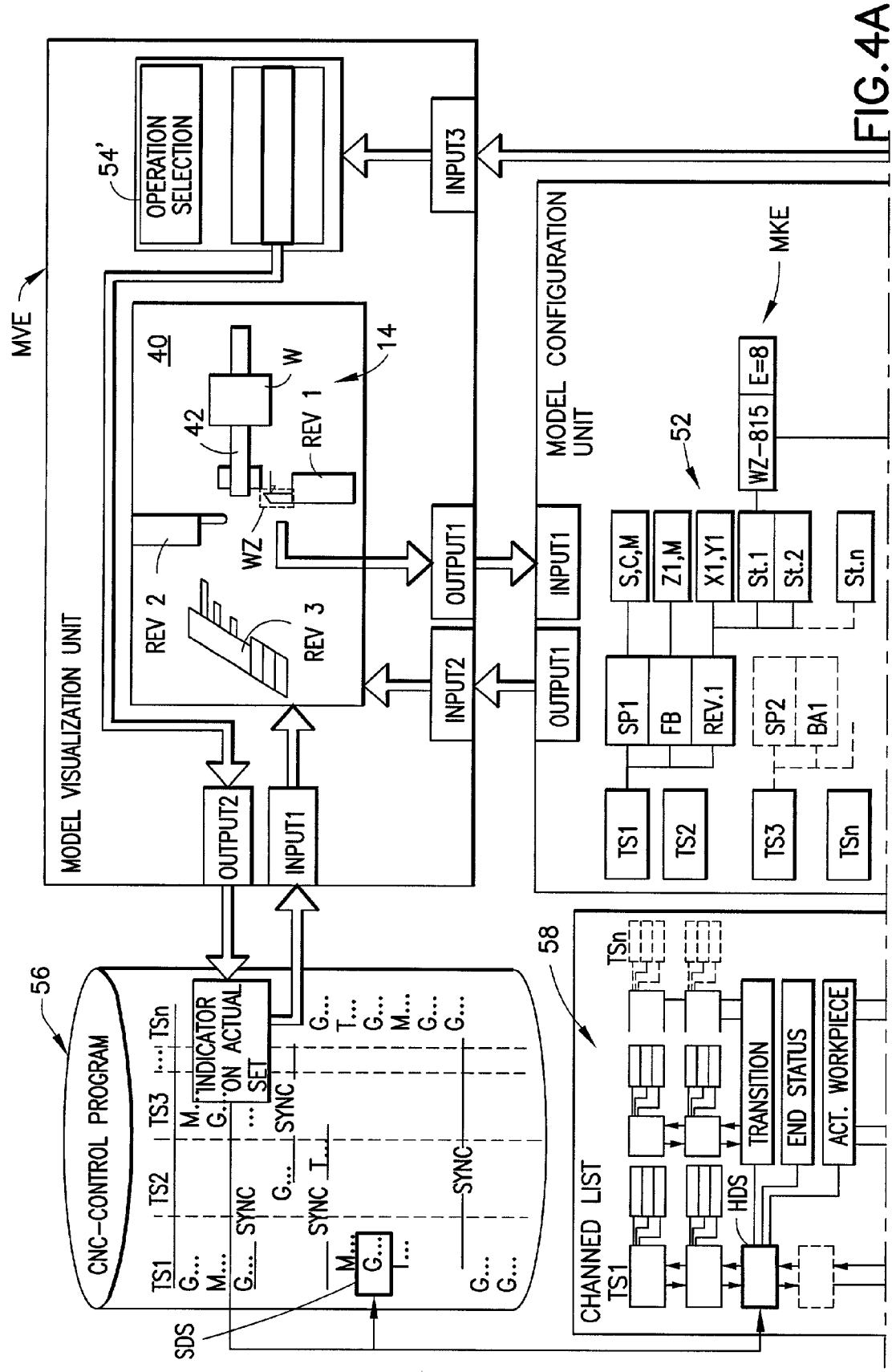
FIG. 4 shows a structured illustration of units and memories comprised by the data processing unit of the inventive system in a block structure.
Figures 4, 4B:
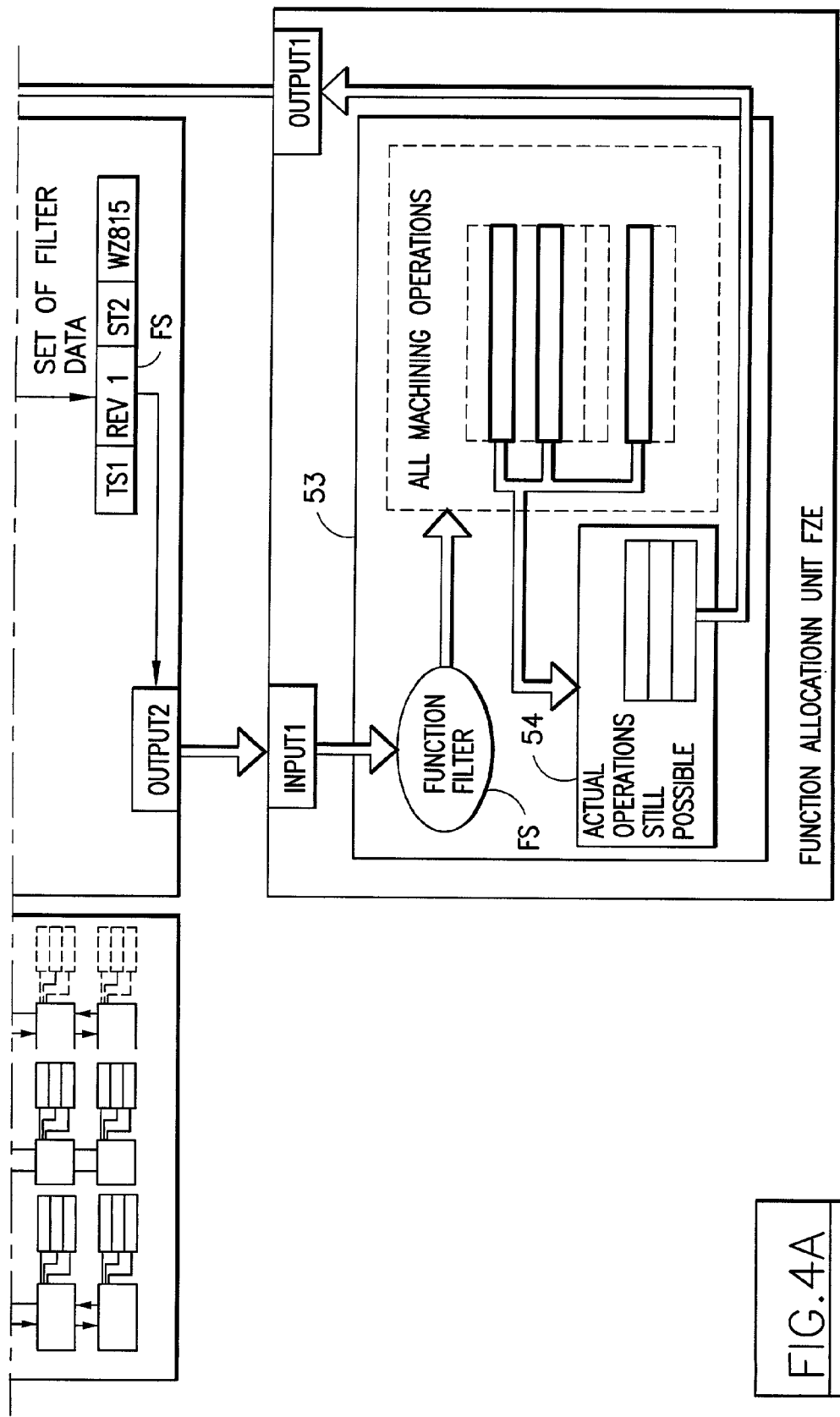

In accordance with the invention, the data processing unit 10 comprises, as illustrated in FIG. 4, a model visualization unit MVE which serves to control the visualization device 14, for example, the screen.

As illustrated in FIG. 4, the model visualization unit generates a machine display 40 on the visualization device 14 and thus a virtual machine tool which comprises, for example, a virtual workpiece spindle W, with a virtual workpiece 42 and several virtual turrets REV1, REV2, REV3 which serve for the machining of the virtual workpiece 42 and can be indexed into several stations as well as equipped in the individual stations with different virtual tools WZ.

The turrets REV1 to REV3 as well as the workpiece spindle W thereby represent individual, virtual operating units of the virtual machine tool, wherein the turrets REV1 to REV3 are operating units of the machine tool, with which the workpiece 42 can be machined in accordance with a desired contour.

Figure 5B:
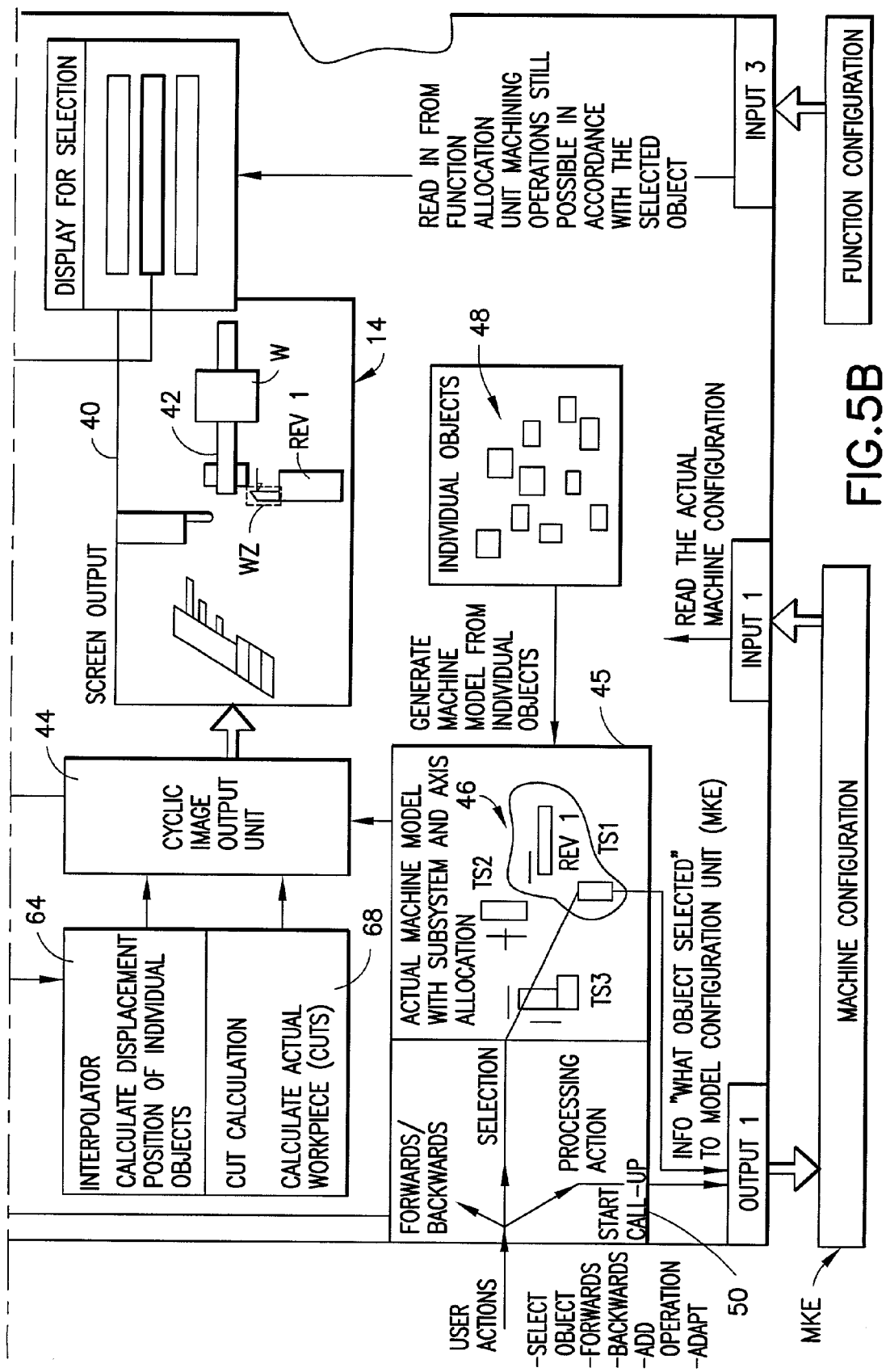
FIG. 5 shows an illustration of individual operating blocks of a model visualization unit in accordance with FIG. 4 as well as their interaction with the remaining units and memories.

In order to represent the virtual operating units REV1 to REV3 as well as W, the model visualization unit MVE, as illustrated again on an enlarged scale in FIG. 5, is provided with a cyclic image output unit 44 which receives the data for the machine display 40 from a machine model unit 45.

The machine model unit 45 generates a machine model 46 of the virtual machine tool, thereby combining individual objects 48 which represent symbols for the virtual operating units and links these individual objects 48 in accordance with data stored in a model configuration unit MKE by interacting with this via output 1 and input 1 thereof (FIG. 4).

In the model configuration unit MKE, the entire machine configuration of the machine tool is stored, i.e. the operating units present in the machine tool 32 as well as the linking thereof and the allocation thereof to individual subsystems or channels of the machine control 34 and the individual axes of movement of the tools WZ.

The model configuration unit MKE preferably comprises first of all for the respective machine tool with machine control details concerning a basic configuration thereof, i.e., for example, details concerning the available subsystems TS1 to Tsn, details concerning the operating units associated therewith, for example machining units in the form of the turrets REV1 to REV3, and the individual stations ST1 to Stn of the turrets, wherein they are first of all not equipped with tools but this can then take place in adaptation to the respective workpiece to be machined.

The inventive model visualization unit MVE is thus adaptable to any machine configuration in that only a change in the data, in particular, of the basic configuration is necessary in the model configuration unit MKE in order to generate a changed machine model 46.

This machine model 46 of the virtual machine tool is now represented on the screen 14 by the cyclic screen output unit 44 and shows all the details which are required by the user to determine the procedure during the machining of the virtual workpiece, in particular, however, without specifying all the data which are not required by the user for determining the machining of the virtual workpiece, i.e., for example, the association of the operating unit with the individual subsystems of the machine control.

It is now possible via the data input unit 12, or via the indicator unit 16 to select an operating unit of the machine model 46, for example, the turret REV1 and the corresponding tool WZ in the corresponding station by means of an action unit 50. The operating unit REV1 selected in this case is represented on the screen 14 so as to stand out accordingly.

The user, to whom the machine display 40 of the machine model 46 is presented first of all in basic configuration, now has the possibility of supplementing the machine model 46 to the extent that additional options in machine configuration can be realized. For example, such an additional option would be the equipping of the individual stations ST1 to Stn of one of the turrets with tools.

This supplemented machine configuration is then recorded not only as supplemented machine model 46 but also as supplemented model configuration unit MKE.

The completed model configuration unit MKE comprises, as illustrated in FIG. 4, data in the form of a hierarchical tree structure 52, also designated as model tree, by means of which, for example, the respective virtual operating unit, for example REV1, is linked to the respective subsystem of the machine control 34, for example TS1, and, in addition, the stations ST1 to STN of the turret REV1 are linked in connection with the equipped tool, for example WZ-815. Furthermore, it results from the tree structure 52 that the turret REV1 can be moved in X1 and Y1 directions and has altogether N stations ST1 to STN which are all equipped with a tool WZ (FIG. 4).

Via an interaction of the model visualization unit MVE with the model configuration unit MKE it is thus possible to derive all the relationships required for the machine model 46 from the model configuration unit MKE and use them to combine individual ones of the objects 48 to form the machine model 46 which is then, for its part, represented as a machine display 40 on the screen 14 via the cyclic image output unit 44. The machine display 40 is so complete that a user has the possibility of recognizing the entire procedure required for the machining of the workpiece 42 and of specifying this by determining the virtual operating units to be used and their virtual actions in all their details.

The model visualization unit MVE offers not only the possibility of addressing only the virtual operating units via the action unit 50 but also of representing the course of the virtual actions, i.e., for example, movements of the tools WZ.

In order to make the determination of the virtual actions of the virtual operating units easier, the model configuration unit MKE is used to generate, on account of the linking of the individual operating units with the control configuration, a set of filter data FS which is passed to a function allocation unit FZE (FIG. 4).

The function allocation unit now has the possibility of selecting the operations still possible for the addressed tool WZ of the operating unit, e.g. REV1, from a list 53 of machining operations, in particular, machining operations on the basis of the set of filter data FS and of combining them in a list 54 which is then transmitted to the model visualization unit MVE and there likewise represented by the visualization device as a list.

A possible machining operation can then be selected 54' from this list 54, for example, by means of the indicator unit 16 and then be allocated to the virtual operating unit, for example, the tool WZ 815 of the turret REV1 in the station ST2. On account of this allocation and the selected machining operation, one or several sets of control data SDS are then generated for the respective subsystems TS which are stored in the system memory unit 18 as control program 56 by the model visualization unit MVE via an output 2.

The model visualization unit MVE does not, however, generate only the sets of control data SDS for the individual subsystems TS of the control program 56 but, in addition, namely using the tree structure 52 stored in the model configuration unit MKE, for each set of control data SDS a set of auxiliary data HDS which comprises, in particular, status data as well as transition and end data. These sets of auxiliary data HDS are stored, for their part, in a chained list 58 for each of the subsystems TS separately from the control program 56 but such that a corresponding set of auxiliary data $HDS_n$ is allocated to each set of control data SDS, and can be located.

All the status information, which not only enables the sets of control data SDS to be run through "forwards" in their timing sequence provided in the control program 56 but also enables these sets of control data SDS to be run through "backwards", is preferably recorded by way of these sets of auxiliary data HDS, wherein it is necessary for this purpose that in addition to the set of control data SDS the so-called status transition information, which allows the sets of control data SDS to be run through "backwards", is also available. If, for example, the opening of a collet of the workpiece spindle by way of a specific command is determined by a set of control data SDS as action, it is then necessary, in order to be able to invert this action, to record in the set of auxiliary data HDS that a transition from "collet closed to collet open" has taken place and, in addition, to likewise record the end status "collet open". With the aid of this information recorded in the set of auxiliary data HDS and the specific command is it now possible to run through the entire process "backwards", namely transfer the collet from the open state into the closed state.

However, not only the transition and, for example, the end status will be stored in the set of auxiliary data HDS in the chained list but also the actual workpiece geometry will be stored in the chained list 58 as part of the set of auxiliary data HDS in the form of a geometry model so that information concerning the geometry of the workpiece 42 is also available for each set of control data SDS.

These geometry data will also be ascertained by the model visualization unit MVE in correlation with the set of control data SDS and stored as part of the set of auxiliary data HDS corresponding to the respective set of control data SDS.

The model visualization unit MVE has, in addition, a reading unit 60 which is in a position to read not only the control program 56 in the system memory unit 18 but also the chained list 58.

Furthermore, the reading unit transfers the recorded and, where applicable, processed sets of control data to a decoder 62 which is in a position to interpret and decode the set and this decoder 62 is connected to an interpolator 64 and transfers to this the interpreted and decoded sets of control data SDS. Based on this, the interpolator 64 controls the movement of the virtual operating units REV1 to REV3 and W and also the tools WZ thereof via the cyclic image output unit 44 taking into account the linkings stored in the machine model 46. The decoder 62 and the interpolator 64 preferably correspond to the decoder and the interpolator of the machine control 34 which control the actual operating units of the machine tool.

If the sets of control data SDS of the control program 56 are now run through "forwards", the details from the sets of control data SDS are sufficient for the decoder 62 and the interpolator 64 to cause all the virtual actions of the virtual operating units REV1 to REV3 and W to run through on the model visualization device 14. The information concerning the geometry of the workpiece is preferably recorded in addition from the sets of auxiliary data HDS of the chained list 58 and likewise represented on the visualization device 14 by the model visualization unit MVE merely for representing the change in shape of the workpiece 42.

If the machining of the workpiece 42 is intended to be represented "backwards", it is not sufficient to read the sets of control data SDS in the control program 56 in the reverse order, i.e. "backwards", but it is necessary for this, in addition, to record the set of auxiliary data $HDS_n$ for each set of control data $SDS_N$ and hereby take into account during the inversion of the sets of control data SDS the end status and the transition as stored in the corresponding set of auxiliary data $HDS_n$.

In order to be able to record the corresponding set of control data $SDS_n$, with the corresponding set of auxiliary data $HDS_n$ at the same time, the model visualization unit MVE comprises in addition an indicator unit 66 which indicates the corresponding set of auxiliary data $HDS_n$ for the respective set of control data $SDS_n$, and thus allows linking of the two.

Associated with the interpolator 64 is, in addition, a cut calculation unit 68 which ascertains, proceeding from the displacement positions of the individual operating units calculated by the interpolator 64, what shape the virtual workpiece 42 is thereby given so that in the machine display 40 not only the displacement positions of the individual operating units can be represented but parallel thereto the actual shape of the virtual workpiece ascertained by the cut calculation unit 68 in accordance with the virtual actions of the virtual operating units.

Figure 6B:
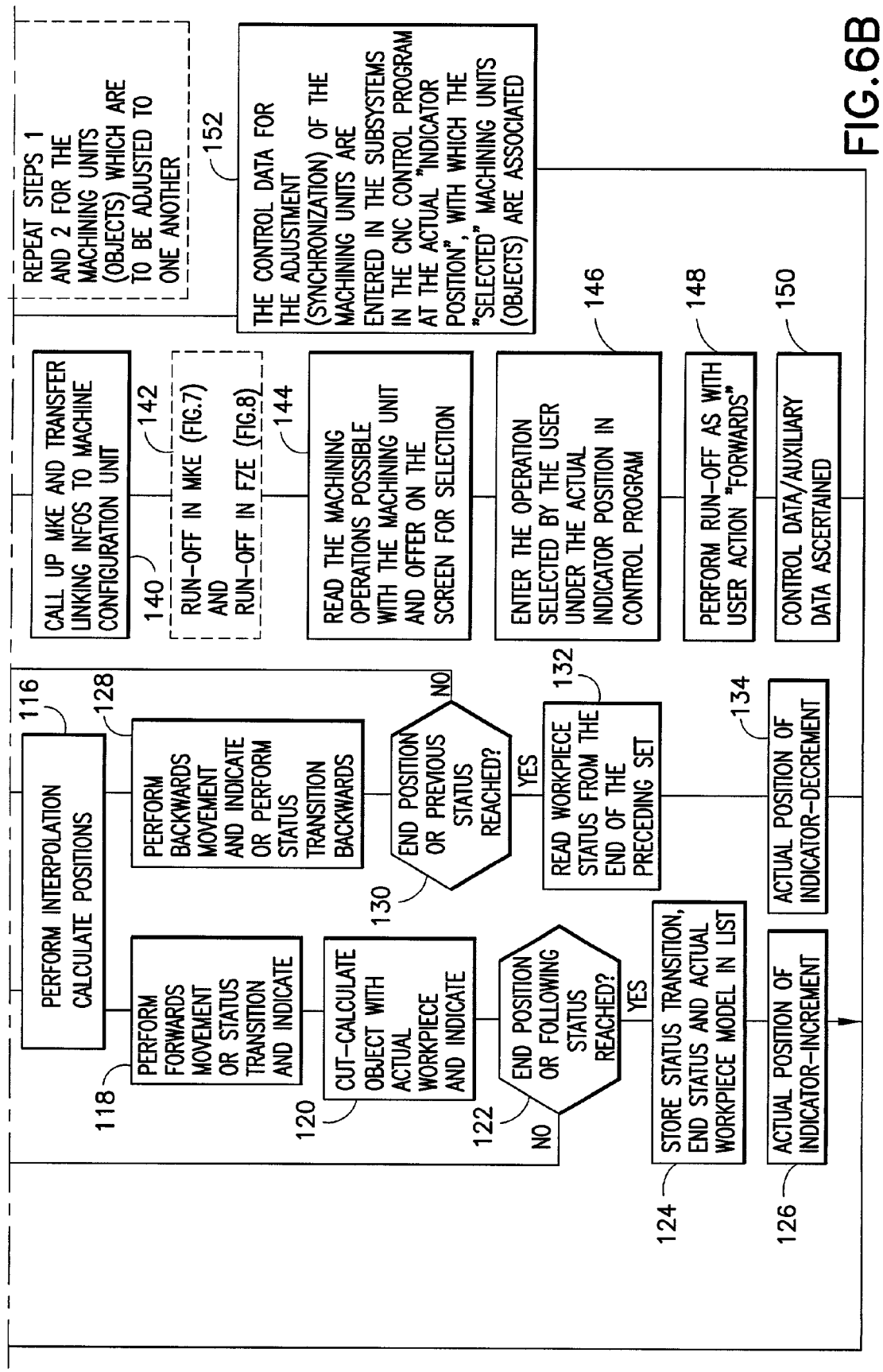
FIG. 6 shows a functional diagram of program runs selected by way of example in the model visualization unit illustrated in FIG. 5.

The mode of operation of the model visualization unit MVE is illustrated by way of example in FIG. 6 in the form of a functional diagram.

When the model visualization unit MVE is started, the actual machine configuration is read from the machine configuration unit MKE in a first step 100. For this purpose, the machine configuration unit MKE is addressed via the output 1 of the model visualization unit MVE and the required data are read in via the input 1 of the machine visualization unit MVE. Based on these data, a machine model 46 of the virtual machine tool corresponding to the machine configuration is generated using the individual objects 48 in the machine model unit 46 and issued in a step 104 via the cyclic image output unit 44 as a machine display 40 on the model visualization unit 14, for example the screen. After representation of the machine display 40, the model visualization unit MVE now waits, as illustrated in step 106, for a user action or user input.

Depending on the user action, illustrated by block 108, a further operation of the model visualization unit MVE now results.

If, for example, a specific operating unit REV1 to REV 3 or W is addressed by a user via the action unit 50, the respective operating unit is marked by the action unit 50 via the machine model unit 45, as specified in block 110, and represented via the cyclic image output unit 44 again as a machine display 40 in accordance with block 104. A further user action is now awaited in accordance with block 106.

If the user action, performed by way of the action unit 50, is, for example, move forwards or move backwards, the set of control data in the control program 56 is read, as illustrated in block 112, as well as the corresponding set of auxiliary data HDS in the chained list 58 by the reading unit 60 in accordance with the position of the indicator unit 66.

The sets of control data are then read and decoded in the decoder 62, as illustrated in block 114, and subsequently, as illustrated in block 116, an interpolation takes place with calculation of the positions of the operating units and simultaneous calculation of the shape of the workpiece by means of the cut calculation unit 68. These details are indicated via the cyclic image output unit 44 in the respective machine display 40.

A forwards movement means, for example, as illustrated in block 118, performance of an operation or a status transition controlled by the interpolator 64 and indication thereof via the cyclic image output unit 44, wherein the shape of the virtual workpiece is likewise calculated immediately thereafter by the cut calculation unit 68, as illustrated in block 120. If the end position is not yet reached, either a jump is made back to block 116, as illustrated in block 122, and blocks 118 and 120 are run through again or when the end position is reached a transfer is made to block 124 and the status transition, the end status and the shape of the virtual workpiece 42 are determined and stored in the chained list 58 as set of auxiliary data HDS. After processing of a set of control data SDS with the corresponding set of auxiliary data HDS, there follows an incrementation, i.e. a transition to the next set of control data SDS, controlled by the indicator unit 66, as illustrated in block 126.

In the case of a backwards movement, the set of control data SDS is performed in reverse direction, proceeding from block 116 and using the details in the set of auxiliary data HDS, as illustrated in block 128, and either, as specified in block 130, a jump is made back to block 116 when the end position is not reached or when the end position is reached a transfer is made to block 132, in which the workpiece status is read from the end of the preceding set. Following block 132, an incrementation of the set of data marked by the indicator unit 66 is then made, as illustrated in block 134.

If a new control program 58 is intended to be generated or a new operation inserted, it is first of all ascertained in accordance with block 136, proceeding from the user action according to block 108, which operating unit in the machine model 46, generated by the machine model unit 45, is selected by means of the action unit 50. Further details, which are necessary for generating a set of control data SDS, are then ascertained for this operating unit in accordance with block 138 using the tree structure 52. This is possible, for example, by addressing the model configuration unit MKE and it will be ascertained, for example, as illustrated in block 140, via the linking information in the model configuration unit MKE that, for example, the tool WZ 115 is arranged in station 1 ST1 of the turret REV1.

The procedures in the model configuration unit MKE and the function allocation unit FZE described in the following in detail are summarized in block 142. The function allocation unit passes the list 54 of the possible operations to the model visualization unit MVE and the model visualization unit likewise represents, as summarized in block 144, the list 54 of the possible operations of the tool WZ 815 on the visualization device 14 in addition to the machine display 40.

The user now has the possibility, as illustrated in block 146, of selecting one of the possible operations by means of the action unit 50 and having this run through forwards, as illustrated in block 148.

At the same time, as illustrated in block 150, the set of control data SDS or the sets of control data SDS together with the set of auxiliary data HDS or the corresponding sets of auxiliary data HDS are ascertained for this virtual action running through on the machine display 40 and stored in the control program 56 and in the chained list 58 via output 2.

A further user action can, proceeding from block 108, be seen in the fact that an adjustment of sets of control data SDS in the individual subsystems TS is necessary. For this purpose, one of the virtual operating units REV1 to REV3 or W is, for example, moved into the position, in which a synchronization with one of the other virtual operating units is intended to take place. The other one of the virtual operating units is then likewise moved into this position and a synchronization command is given.

The model visualization unit MVE then stores this synchronization command by means of a set of control data SDS in the control program 56 and at the same time files the corresponding set of auxiliary data HDS in the chained list 58.

The operation run-off in the model configuration unit MKE is illustrated by way of example in FIG. 7.

After the start, it is specified to the model configuration unit MKE, for example, in block 160 via output 1 of the model visualization unit MVE which of the operating units has been selected by the action unit 50. Proceeding from this, the model configuration unit MKE, as specified in block 162, reads in the tree structure 52, which is present either in the machine model unit 45 and/or in the model configuration unit, which subsystem is associated with this operating unit and enters the subsystem information in the set of filter data FS, as specified in block 164.

Subsequently, the tree structure is successively processed. According to block 166, the node, i.e. the link for the corresponding subsystem, is located and then the information concerning the respective machining unit is read in block 168 and entered in the filter data structure FS according to block 170.

In the following block 172, the next node relating to the connection of the machining unit with the respective tool station is located and the information concerning the selected tool station is read in block 174 and entered in the set of filter data FS in block 176.

Further on in the tree structure 52, the node for the linking of the tool station with the respective tool is ascertained in accordance with block 178 and the data for the tool are read from the tree structure 52 in accordance with block 180, wherein the data for the tool can be of many different kinds.

They may be suitability data which specify, for which machining the tool may be used, and they may be tool dimensions. These suitability data are then entered in the set of filter data FS in accordance with block 182.

Using this set of filter data FS, the function allocation unit FZE is now called up in accordance with block 184 and the list of machining operations possible with this tool is now ascertained in this unit, as illustrated in a summarized manner in block 186, as will be explained in detail in conjunction with FIG. 8.

Figure 8:
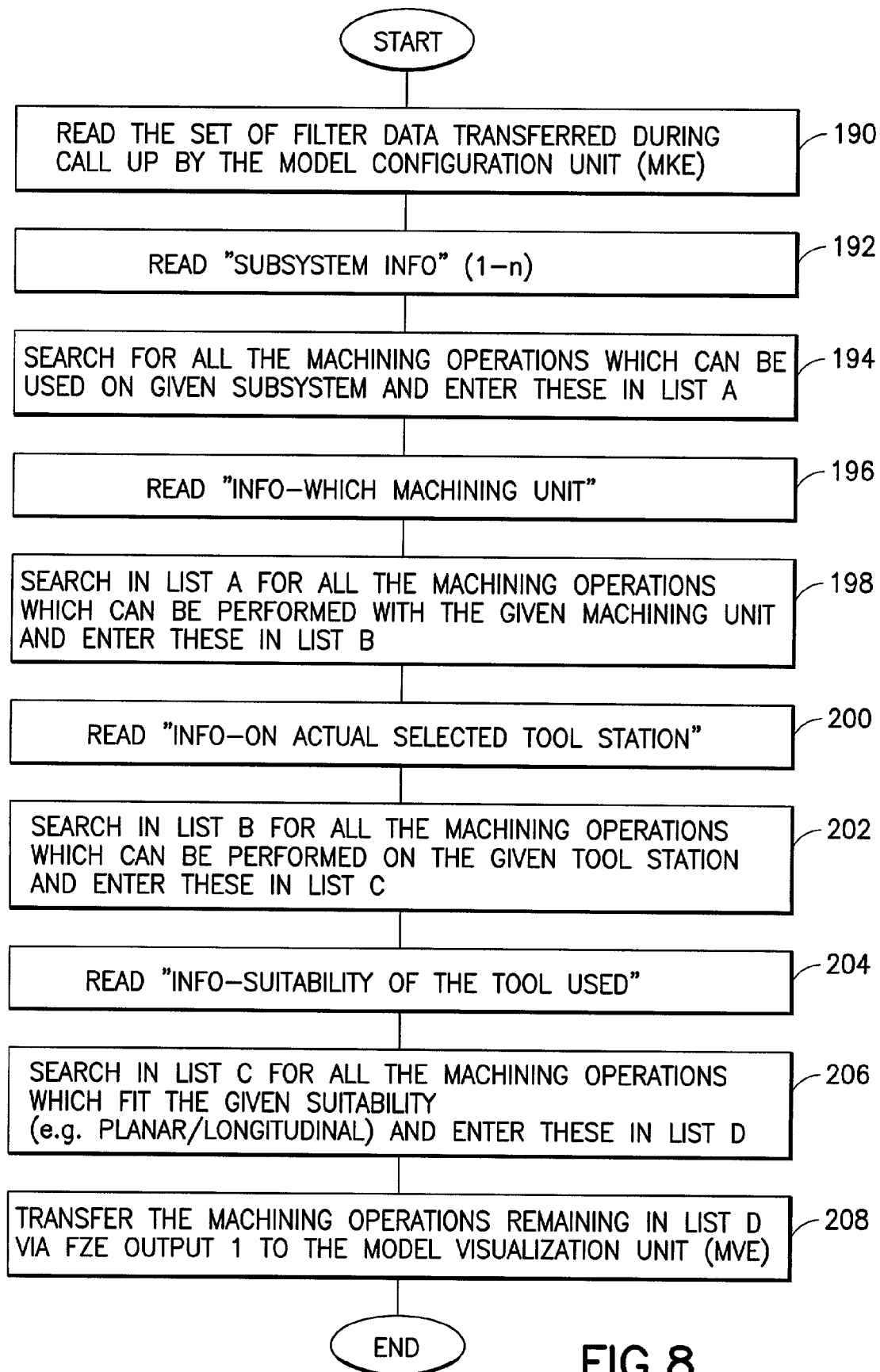
FIG. 8 shows a functional diagram for generation of a list of possible machining operations in a function allocation unit in accordance with FIG. 4.

The run-off in the function allocation unit FZE, illustrated in FIG. 8, is as follows:

First of all, as illustrated in block 190, the set of filter data FS is read in via output 2 of the model configuration unit MKE and input 1 of the function allocation unit FZE when the function allocation unit FZE is called up by the model configuration unit MKE. Then, the information relating to the respective subsystem is read first of all in accordance with block 192 and in accordance with this information those machining operations which can be used on the subsystem in accordance with the set of filter data FS are selected in the list 53 of all the possible machining operations in accordance with block 194 and these are then entered in a list A.

Subsequently, the information operating unit or machining unit is read in the set of filter data FS in accordance with block 196 and in accordance with block 198 all the machining operations which can be performed with the respectively specified machining unit are located in the list A and entered in a list B. In accordance with block 200, the information concerning the actual tool station is subsequently read in the set of filter data FS and all the machining operations which can be performed on the given tool station are located in the list B and entered in a list C, as illustrated in block 202. Subsequently, as illustrated in block 204, the information relating to the tool, in particular, the suitability of the tool is read in the set of filter data FS and thereafter, as illustrated in block 206, all the machining operations which fit the given suitability are recorded via this information relating to the suitability of the tool from the list C and entered in list D.

The list D corresponds to the list 54 of the actions or machining operations possible with this tool in the respective tool station of the respective machining unit, allocated to the respective subsystem, and this list 54 is transmitted to the model visualization unit MVE via an output 1 of the function allocation unit and recorded via an input 3. The model visualization unit MVE then represents the entire contents of the list 54 of all the possible machining operations on the model visualization device 14, as illustrated in block 208.

One or more machining operations can now be selected from the list 54 of all the machining operations, which are possible with the respective tool and represented on the model visualization device 14, and allocated to the respective tool.

The model visualization unit MVE now ascertains the set of control data SDS or the sets of control data SDS and, together with the sets of auxiliary data HDS, on the basis of this selected machining operation or machining operations and stores these in the control program 56 and in the chained list 58.

After the sets of control data SDS have been stored, the selected machining operations are represented immediately thereafter, namely by reading the sets of control data SDS and, where applicable, sets of auxiliary data SDS generated immediately prior thereto with the reading unit 60 in the manner described, so that by using the decoder 62 and the interpolator 64 the movements of the respective tool WZ can be represented and, on the other hand, the cut calculation unit 68 ascertains the change in the virtual workpiece 42 at the same time and likewise represents it via the cyclic image output unit, as described above.

In this respect—as likewise described above—the machining can be represented within the scope of a forwards run as well as within the scope of a backwards run in order to give the user the possibility of reproducing in detail the machining of the virtual workpiece 42 which has just been programmed and of checking this with a view to its correctness.

The inventive model visualization unit MVE is, however, not necessarily usable exclusively in conjunction with the inventive programming system but it is also conceivable to use the model visualization unit, without the possibility of addressing individual, virtual operating units and specifying virtual actions to them, for the purpose of representing a control program 56 which already exists in forwards and backwards runs and thus of visualizing control programs for machine tools on the basis of the virtual machine tool generated by the machine model unit 45 and allowing them to be checked by a user by means of the visualization device, wherein the user is also given, on account of the cut calculation unit 68, a representation of how the virtual workpiece 42 will change when the virtual machining is carried out and, in addition, the user has the possibility of checking the respective machining in a forwards run and a backwards run.

In the case of such use of the model visualization unit, sets of control data SDS are read set for set by means of the reading unit 60 proceeding from a specified control program 56, decoded in the decoder 62 and in the interpolator 64 the movements of the virtual operating units are then controlled, wherein the cyclic image output unit 44 then controls the visualization device 14.

At the same time, the change in shape of the virtual workpiece 42 is ascertained with the cut calculation unit 68 and, in addition, the machine model 46 is used in the machine model unit 45 for carrying out the control commands coming from the interpolator 64 on the virtual machine tool so that the virtual operating units and virtual workpieces 42 represented on the visualization device 14 behave in accordance with the conditions of the actual machine tool.

At the same time, the corresponding set of auxiliary data HDS is generated for each set of control data SDS by the model visualization unit MVE using the machine model 46 and stored in the chained list 58 so that during a so-called "forwards run", for which the sets of control data SDS are sufficient to be able to visualize the virtual machine tool and the machining operations together with the machine model 46, the sets of auxiliary data HDS are ascertained at the same time and stored in the chained list 58 so that a backwards run is also possible following a forwards run.

The invention claimed is:

1. A computer-implemented method for generating a control program for a machine tool, said machine tool having at least one sequence of sets of control data for the machining of a workpiece by means of operating units controlled by the control programs, comprising:
   providing a machine display for presenting a visualization of a virtual workpiece and at least two virtual operating units to a user by a data processing unit, each of said virtual operating units corresponding to an operating unit of said machine tool,
   addressing at least one of said virtual operating units by the user to specify virtual action(s) for said at least one virtual operating unit via a data input unit and visualizing said at least two virtual operating units and said specified virtual action(s) of said at least one virtual operating unit on said machine display to show relative movement between said at least two virtual operating units on said machine display, and
   converting the action(s) specified to said at least one virtual operating unit into sets of control data of the control program by the data processing unit taking into account a machine configuration and control configuration specified to said machine tool.

2. A method as defined in claim 1, wherein all of the virtual operating units of the machine tool are presented to the user in accordance with an actual machine configuration in on said machine display.

3. A method as defined in claim 2, wherein all of the virtual operating units and their virtual actions are represented, taking into account the machine and control configuration of the machine tool.

4. A method as defined in claim 1, wherein the virtual operating units and their virtual actions are represented for the user after they have been addressed and specified.

5. A method as defined in claim 1, wherein a linking of virtual operating units specified in a defined mariner is carried out automatically by the data processing unit in order to take into account the machine and control configuration.

6. A method as defined in claim 1, wherein the machine and control configuration is taken into account with the aid of a machine model comprising information concerning linkings of the virtual operating units representing the machine and control configuration.

7. A method as defined in claim 6, wherein the machine model comprises a basic configuration of the virtual operating units of the machine tool extendible by the user.

8. A method as defined in claim 6, wherein the machine model is generated by means of stored linking information.

9. A method as defined in claim 6, wherein the machine model linking the individual, virtual operating units of the machine tool in accordance with the machine and control configuration is stored in the data processing unit.

10. A method as defined in claim 6, wherein the machine model is utilized in the data processing unit in the form of a data tree structure.

11. A method as defined in claim 10, wherein the data tree structure has the form of a hierarchical data tree structure.

12. A method as defined in claim 1, wherein for each virtual operating unit the machining operations realizable therewith are ascertained automatically by the data processing unit.

13. A method as defined in claim 12, wherein a set of filter data is generated for ascertaining the realizable machining operation.

14. A method as defined in claim 13, wherein the set of filter data is generated on the basis of the machine and control configuration.

15. A method as defined in claim 13, wherein the set of filter data is ascertained independently by the data processing unit in accordance with the machine and control configuration.

16. A method as defined in claim 13, wherein a list of machining operations performable with the respective virtual operating unit is selected from a list of all the possible machining operations with the set of filter data.

17. A method as defined in claim 16, wherein the list with the machining operations allocated to the respective virtual operating unit is presented so as to be selectable for a user.

18. A method as defined in claim 12, wherein the sets of control data for the control program are ascertained automatically by the data processing unit on the basis of the addressed, virtual operating unit and the virtual machining operation correspondingly selected.

19. A method as defined in claim 1, wherein the change in shape of a virtual workpiece due to machining thereof is represented by means of virtual actions of the virtual operating units.

20. A method as defined in claim 19, wherein the change in shape of the virtual workpiece is ascertained by way of a cut calculation.

21. A method as defined in claim 1, wherein the sets of control data of the control program are decoded and interpolated by the data processing unit in the same way as in a decoder and an interpolator of the machine control for the operating units of the machine tool.

22. A method as defined in claim 21, wherein the virtual actions of the virtual operating units are ascertained and represented during the interpolation using the machine and control configuration.

23. A method as defined in claim 22, wherein the machine model is used during the interpolation for ascertaining the virtual actions.

24. A method as defined in claim 19, wherein the machining of the virtual workpiece is represented at any time on said virtual workpiece.

25. A method as defined in claim 1, wherein the virtual actions of the virtual operating units are visualized in a machining sequence provided for a machining of the virtual workpiece or in a reverse machining sequence.

26. A method as defined in claim 25, wherein in addition to the sets of control data, auxiliary data allowing a visualization of the virtual actions in a reverse machining sequence are generated for each set of control data taking into account the machine tool and control configuration.

27. A method as defined in claim 26, wherein the auxiliary data are allocated to each set of control data in the form of a set of auxiliary data.

28. A method as defined in claim 27, wherein the sets of auxiliary data are stored in a chained list.

29. A method as defined in claim 27, wherein the set of auxiliary data comprises a set of transition and/or status data.

30. A method as defined in claim 1, wherein shape data of the virtual workpiece are ascertained for each set of control data.

31. A method as defined in claim 30, wherein the shape data are stored in the set of auxiliary data.

32. A method as defined in claim 28, wherein not only the control program but also the chained list is accessed and the corresponding set of auxiliary data are read from the chained list for each set of control data.

33. A method as defined in claim 32, wherein not only the set of control data to be processed but also the associated set of auxiliary data are determined at the same time by the data processing unit.

34. A method as defined in claim 28, wherein the chained list is stored and a set of auxiliary data is clearly allocated to each set of control data.

35. A method as defined in claim 26, wherein sets of control data and auxiliary data are recorded with the data processing unit in machining sequence or in reverse machining sequence and represented by the virtual operating units and virtual actions.

36. A computerized programming system for generating a control program to provide machining of a workpiece by means of operating units of a machine tool, comprising:
   a data input unit for entering and/or changing information determining the control program of the machine tool,
   a visualization device for representing said information, and
   a data processing unit adapted to convert the information into sets of control data determining the control program and storing these in a program memory, wherein:
   the data processing unit comprises a model visualization unit designed such that with it at least two virtual operating units of the machine tool and virtual actions of the virtual operating units are representable by means of said visualization device, each of said virtual operating units corresponding to an operating unit of said machine tool,
   the model visualization unit interacting with the data input unit such that at least one of said virtual operating units is addressable via the data input unit and virtual actions are specifiable to said at least one virtual operating unit and representable by means of said visualization device, said visualization device providing a visualization of said at least two virtual operating units and said specified virtual actions of said at least one virtual operating unit to show relative movement between said at least two virtual operating units, and
   with the model visualization unit the virtual actions specified to the at least one virtual operating unit are convertible into the sets of control data of the control program taking into account a machine configuration and control configuration.

37. A programming system as defined in claim 36, wherein with the model visualization unit, all of the virtual operating units of the machine tool are representable on the visualization device in the form of a machine display, in accordance with the actual machine configuration.

38. A programming system as defined in claim 36, wherein the model visualization unit represents the virtual operating units and their virtual actions on the visualization device taking into account the machine and control configuration of the machine tool.

39. A programming system as defined in claim 36, wherein the model visualization unit represents the virtual operating units and their virtual actions on the visualization device after they have been addressed and specified.

40. A programming system as defined in claim 36, wherein a linking of virtual operating units specified in a defined manner takes place by means of a model configuration unit interacting with the model visualization unit, in order to take into account the machine and control configuration.

41. A programming system as defined in claim 36, wherein the machine and control configuration is taken into account with the aid of a machine model generated by the model visualization unit, said machine model comprising information concerning linkings of the virtual operating units representing the machine and control configuration.

42. A programming system as defined in claim 41, wherein the machine model comprises a basic configuration of the virtual operating units of the machine tool extendible by the user.

43. A programming system as defined in claim 41, wherein the machine model is generatable by means of linking information from a model configuration unit.

44. A programming system as defined in claim 41, wherein the data processing unit has a main memory for storage of the machine model linking the individual, virtual operating units of the machine tool in accordance with the machine and control configuration.

45. A programming system as defined in claim 41, wherein the machine model is available to the data processing unit in the form of a data tree structure.

46. A programming system as defined in claim 45, wherein the data tree structure has the form of a hierarchical data tree structure.

47. A programming system as defined in claim 36, wherein a function allocation unit is allocated to the model visualization unit, the machining operation realizable with each virtual operating unit being ascertainable for each operating unit with said function allocation unit.

48. A programming system as defined in claim 47, wherein a set of filter data is generatable for ascertaining the realizable machining operation.

49. A programming system as defined in claim 48, wherein the set of filter data is generatable on the basis of the machine and control configuration.

50. A programming system as defined in claim 48, wherein the model configuration unit generates the set of filter data in accordance with the machine and control configuration and transmits this set of filter data to the function allocation unit.

51. A programming system as defined in claim 48, wherein with the set of filter data, the function allocation unit selects from a list of all possible machining operations a list of machining operations performable with the respective virtual operating units.

52. A programming system as defined in claim 51, wherein the function allocation unit presents the list with the machining operations allocated to the respective virtual operating units via the model visualization unit so as to be selectable for a user.

53. A programming system as defined in claim 47, wherein the model visualization unit automatically ascertains the sets of control data for the control program on the basis of the addressed operating unit and the virtual machining operation selected accordingly.

54. A programming system as defined in claim 36, wherein the model visualization unit represents the change in shape of a virtual workpiece by way of machining thereof by means of virtual actions of the virtual operating units.

55. A programming system as defined in claim 54, wherein the change in shape of the virtual workpiece is ascertainable by way of a cut calculation unit.

56. A programming system as defined in claim 36, wherein the model visualization unit has a decoder and an interpolator for the sets of control data of the control program corresponding to a decoder and an interpolator of the machine control for the operating unit of the machine tool.

57. A programming system as defined in claim 56, wherein the interpolator ascertains the virtual actions of the virtual operating units using the machine and control configuration and the model visualization unit represents these on the visualization device.

58. A programming system as defined in claim 57, wherein the interpolator is used to ascertain the virtual actions of the machine model.

59. A programming system as defined in claim 54, wherein the model visualization unit is designed such that the machining of the virtual workpiece is representable at any time on said virtual workpiece.

60. A programming system as defined in claim 36, wherein the virtual actions of the virtual operating units are visualizable in a machining sequence provided for a machining of the virtual workpiece or in a reverse machining sequence.

61. A programming system as defined in claim 60, wherein in addition to generating said sets of control data, the model visualization unit generates auxiliary data for each set of control data taking into account the machine tool and control configuration, said auxiliary data permitting a visualization of the virtual actions in a reverse machining sequence.

62. A programming system as defined in claim 61, wherein the model visualization unit allocates the auxiliary data to each set of control data in the form of a set of auxiliary data.

63. A programming system as defined in claim 62, wherein the model visualization unit stores the sets of auxiliary data in a chained list.

64. A programming system as defined in claim 62, wherein the set of auxiliary data comprises a set of transition and/or status data.

65. A programming system as defined in claim 36, wherein the model visualization unit ascertains shape data of the virtual workpiece for each set of control data.

66. A programming system as defined in claim 65, wherein the model visualization unit stores the shape data in the set of auxiliary data.

67. A programming system as defined in claim 63, wherein the model visualization unit is designed such that it accesses not only the control program but also the chained list, and the corresponding set of auxiliary data is readable from the chained list for each set of control data.

68. A programming system as defined in claim 67, wherein the model visualization unit determines by means of an indicator unit not only the set of control data to be processed, but also the associated set of auxiliary data.

69. A programming system as defined in claim 61, wherein the model visualization unit is designed such that with it sets of control data and auxiliary data are recordable in machining sequence or in reverse machining sequence and are representable by way of the virtual operating units and virtual actions.

70. A programming system as defined in claim 63, wherein the data processing unit has a system program memory for storing the control program.

71. A programming system as defined in claim 70, wherein the chained list is stored in the system program memory and that a set of auxiliary data is clearly allocated to each set of control data.

* * * * *

UNITED STATES PATENT AND TRADEMARK OFFICE
CERTIFICATE OF CORRECTION

| | |
|---|---|
| PATENT NO. | : 7,209,800 B2 |
| APPLICATION NO. | : 10/023389 |
| DATED | : April 24, 2007 |
| INVENTOR(S) | : Monz et al. |

It is certified that error appears in the above-identified patent and that said Letters Patent is hereby corrected as shown below:

Column 20, line 60: correct "mariner" to read -- manner --.

Signed and Sealed this

Nineteenth Day of June, 2007

JON W. DUDAS
*Director of the United States Patent and Trademark Office*